United States Patent
Ogura

(10) Patent No.: US 11,503,503 B2
(45) Date of Patent: Nov. 15, 2022

(54) ADDING FRAMING PROTOCOL HEADER TO DOWNLINK DATA

(71) Applicant: NEC CORPORATION, Tokyo (JP)

(72) Inventor: Daisuke Ogura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 637 days.

(21) Appl. No.: 16/326,509

(22) PCT Filed: Aug. 31, 2017

(86) PCT No.: PCT/JP2017/031373
§ 371 (c)(1),
(2) Date: Feb. 19, 2019

(87) PCT Pub. No.: WO2018/061601
PCT Pub. Date: Apr. 5, 2018

(65) Prior Publication Data
US 2021/0289395 A1    Sep. 16, 2021

(30) Foreign Application Priority Data
Sep. 29, 2016 (JP) .............................. JP2016-191763

(51) Int. Cl.
*H04W 28/06* (2009.01)
*H04W 76/12* (2018.01)
(Continued)

(52) U.S. Cl.
CPC ........... *H04W 28/065* (2013.01); *H04L 69/18* (2013.01); *H04W 28/0268* (2013.01);
(Continued)

(58) Field of Classification Search
CPC .......... H04W 28/065; H04W 28/0268; H04W 28/10; H04W 76/12; H04L 2212/00
See application file for complete search history.

(56) References Cited

U.S. PATENT DOCUMENTS

| | | |
|---|---|---|
| 2008/0008092 A1 | 1/2008 | Wang et al. |
| 2011/0103310 A1 | 5/2011 | Stojanovski et al. |

(Continued)

FOREIGN PATENT DOCUMENTS

| | | |
|---|---|---|
| EP | 2 667 656 A1 | 11/2013 |
| EP | 2 753 028 A1 | 7/2014 |

(Continued)

OTHER PUBLICATIONS

LTE-WLAN Aggregation, Pavan Nuggehalli, MediaTek Inc.; Aug. 2016; p. 6.*

(Continued)

*Primary Examiner* — Jackie Zuniga Abad

(57) ABSTRACT

In order to allow for improvement on a case where data of a cellular network is transmitted and/or received through a wireless local area network (WLAN), a base station of the present invention includes: a first communication processing unit configured to add a header of a framing protocol to downlink data transmitted to a terminal apparatus; and a second communication processing unit configured to transmit the downlink data to which the header is added to a gateway that is used for transmission from the base station to the terminal apparatus through a wireless local area network. The framing protocol is a protocol for communication between the base station and the gateway and the header includes identification information corresponding to quality of service for the downlink data.

16 Claims, 23 Drawing Sheets

(51) Int. Cl.
  *H04L 69/18* (2022.01)
  *H04W 28/02* (2009.01)
  *H04W 28/10* (2009.01)
  *H04W 84/12* (2009.01)

(52) U.S. Cl.
  CPC ........... *H04W 28/10* (2013.01); *H04W 76/12* (2018.02); *H04L 2212/00* (2013.01); *H04W 84/12* (2013.01)

(56) References Cited

U.S. PATENT DOCUMENTS

| | | | | |
|---|---|---|---|---|
| 2013/0343269 | A1* | 12/2013 | Evans | H04W 40/02 370/328 |
| 2014/0341017 | A1* | 11/2014 | Mutikainen | H04W 28/0268 370/230 |
| 2015/0110009 | A1* | 4/2015 | Berzin | H04W 88/06 |
| 2015/0208323 | A1 | 7/2015 | Joung et al. | |
| 2015/0229970 | A1 | 8/2015 | Ma et al. | |
| 2016/0337958 | A1 | 11/2016 | Fujishiro et al. | |
| 2017/0099625 | A1* | 4/2017 | Li | H04W 76/16 |
| 2017/0332279 | A1 | 11/2017 | Kobayashi et al. | |

FOREIGN PATENT DOCUMENTS

| | | |
|---|---|---|
| JP | 2009-543451 A | 12/2009 |
| JP | 2013-509787 A | 3/2013 |
| JP | 2014-527771 A | 10/2014 |
| JP | 2015-136090 A | 7/2015 |
| WO | 2015/170764 A1 | 11/2015 |
| WO | 2016/093166 A1 | 6/2016 |

OTHER PUBLICATIONS

3GPP TS 33.401 V13.3.0 (Aug. 2016), pp. 141-144 (Year: 2016).*
Notice of Reasons for Refusal dated Mar. 10, 2020, from the Japanese Patent Office in Application No. 2018-542026.
Written Opinion in International Application No. PCT/JP2017/031373, dated Nov. 28, 2017.
Communication dated Jun. 7, 2019, from the European Patent Office in counterpart European Application No. 17855559.5.
Richard Burbidge, "Liaison from 3GPP on LWA and LWIP", IEEE 802.11-16/351r0, Mar. 11, 2016, pp. 1-25, XP055382059 (25 pages total).
Nokia Networks, et al., "Stage-2 text for LWIP Tunnel Clarifications", 3GPP TSG-RAN WG2 Meeting #93, R2-161991 (revision of R2-161927), Malta, Feb. 15-19, 2016, 3rd Generation Partnership Project (3GPP), Mobile Competence Centre; 650, Route Des Lucioles; F-06921 Sophia-Antipolis Cedex; France, XP051055783 (6 pages total).
"TS 36.464, V1.4.0", 3GPP TSG-RAN WG3 #Ad Hoc, R3-160456, Intel Corporation, Jan. 20-22, 2016, Budapest, Hungary, 9 pages.
3rd Generation Partnership Project; Technical Specification Group Services and System Aspects; Telecommunication management; Performance Management (PM); Performance measurements, Evolved Universal Terrestrial Radio Access Network, (E-UTRAN), (Relase 14), 3GPP TS 32.425 V14.0.0 (Mar. 2016), 79 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", 3GPP TS 36.300 V13.4.0, (Oct. 2016), 310 pages.
"3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 13)", 3GPP TS 36.361 V13.1.0 (Jun. 2016), 10 pages.
International Search Report for PCT/JP2017/031373, dated Nov. 28, 2017.

* cited by examiner

ADDING FRAMING PROTOCOL HEADER TO DOWNLINK DATA

CROSS REFERENCE TO RELATED APPLICATIONS

This Application is a National Stage of International Application No. PCT/JP2017/031373 filed Aug. 31, 2017, claiming priority based on Japanese Patent Application No. 2016-191763 filed Sep. 29, 2016, the entire disclosure of which is incorporated herein.

BACKGROUND

Technical Field

The present invention relates to base stations, gateways, methods, programs and recording media.

Background Art

At present, LTE/WLAN Radio Level Integration with IPsec Tunnel (LWIP) is under consideration in Third Generation Partnership Project (3GPP) as a data transfer scheme which utilizes both of evolved Node B (eNB) and Wireless Local Area Network Access Point (WLAN-AP).

For example, non-patent literature (NPL) 1 and NPL 2 disclose technologies related to LWIP. Specifically, for example, a UE uses an LWIP function to add an LWIP Encapsulation Protocol (LWIPEP) header to uplink data that it transmits through a Wireless Local Area Network (WLAN). This enables an eNB which receives the uplink data to identify a bearer corresponding to the uplink data.

CITATION LIST

Non-Patent Literature

[NPL 1] 3GPP TS 36.300 V13.4.0 (2016-06), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)
[NPL 2] 3GPP TS 36.361 V13.1.0 (2016-06), 3rd Generation Partnership Project; Technical Specification Group Radio Access Network; Evolved Universal Terrestrial Radio Access (E-UTRA); LTE/WLAN Radio Level Integration Using IPsec Tunnel (LWIP) encapsulation; Protocol specification (Release 13)

SUMMARY

Technical Problem

It is important in LWIP that Quality of Service (QoS) depending on data is satisfied even in a case where data is transmitted and/or received between an eNB and a UE through WLAN. However, there has been no discussion in 3GPP about a technology for satisfying quality of service in LWIP.

An example object of the present invention is to allow for improvement on the case where data of a cellular network is transmitted and/or received through Wireless Local Area Network (WLAN).

Solution to Problem

A first base station according to the present invention includes a first communication processing unit configured to add a header of a framing protocol to downlink data transmitted to a terminal apparatus; and a second communication processing unit configured to transmit the downlink data to which the header is added to a gateway that is used for transmission from the first base station to the terminal apparatus through a wireless local area network. The framing protocol is a protocol for communication between the first base station and the gateway, and the header includes identification information corresponding to quality of service for the downlink data.

A first gateway according to the present invention includes a first communication processing unit configured to add a header of a framing protocol to uplink data transmitted by a terminal apparatus through a wireless local area network; and a second communication processing unit configured to transmit the uplink data to which the header is added to a base station. The framing protocol is a protocol for communication between the first gateway and the base station, and the header includes identification information corresponding to quality of service for the uplink data.

A second gateway according to the present invention includes a communication processing unit configured to transmit, to a terminal apparatus through a wireless local area network, downlink data from a base station or receive uplink data from a terminal apparatus through the wireless local area network; and an information obtaining unit configured to obtain convergence information about convergence at the second gateway or the wireless local area network. The communication processing unit is configured to transmit the convergence information to the base station.

A second base station according to the present invention includes a communication processing unit configured to receive, from a gateway that is used for communication between the second base station and a terminal apparatus through a wireless local area network, convergence information about convergence at the gateway or the wireless local area network.

A third base station according to the present invention includes a communication processing unit configured to receive, from a gateway that is used for communication between the third base station and a terminal apparatus through a wireless local area network, performance information about communication performance at the gateway or the wireless local area network; and a measurement unit configured to measure performance related to the gateway or the wireless local area network on the basis of the performance information.

A third gateway according to the present invention includes a communication processing unit configured to transmit, to a terminal apparatus through a wireless local area network, downlink data from a base station or receive uplink data from a terminal apparatus through the wireless local area network; and an information obtaining unit configured to obtain performance information about communication performance at the third gateway or the wireless local area network. The communication processing unit is configured to transmit the performance information to the base station.

A first method according to the present invention includes adding a header of a framing protocol to downlink data transmitted to a terminal apparatus; and transmitting the downlink data to which the header is added to a gateway that is used for transmission from a base station to the terminal apparatus through a wireless local area network. The framing protocol is a protocol for communication between the base station and the gateway. The header includes identification information corresponding to quality of service for the downlink data.

A first program according to the present invention is a program for causing a processor to execute: adding a header of a framing protocol to downlink data transmitted to a terminal apparatus; and transmitting the downlink data to which the header is added to a gateway that is used for transmission from a base station to the terminal apparatus through a wireless local area network. The framing protocol is a protocol for communication between the base station and the gateway. The header includes identification information corresponding to quality of service for the downlink data.

A first recording medium according to the present invention is a computer-readable non-transitory recording medium having recorded thereon a program for causing a processor to execute: adding a header of a framing protocol to downlink data transmitted to a terminal apparatus; and transmitting the downlink data to which the header is added to a gateway that is used for transmission from a base station to the terminal apparatus through a wireless local area network. The framing protocol is a protocol for communication between the base station and the gateway. The header includes identification information corresponding to quality of service for the downlink data.

A second method according to the present invention includes adding a header of a framing protocol to uplink data transmitted by a terminal apparatus through a wireless local area network; and transmitting the uplink data to which the header is added to a base station. The framing protocol is a protocol for communication between a gateway and the base station. The header includes identification information corresponding to quality of service for the uplink data.

A second program according to the present invention is a program for causing a processor to execute: adding a header of a framing protocol to uplink data transmitted by a terminal apparatus through a wireless local area network; and transmitting the uplink data to which the header is added to a base station. The framing protocol is a protocol for communication between a gateway and the base station. The header includes identification information corresponding to quality of service for the uplink data.

A second recording medium according to the present invention is a computer-readable non-transitory recording medium having recorded thereon a program for causing a processor to execute: adding a header of a framing protocol to uplink data transmitted by a terminal apparatus through a wireless local area network; and transmitting the uplink data to which the header is added to a base station. The framing protocol is a protocol for communication between a gateway and the base station. The header includes identification information corresponding to quality of service for the uplink data.

A third method according to the present invention includes transmitting, to a terminal apparatus through a wireless local area network, downlink data from a base station or receiving uplink data from a terminal apparatus through the wireless local area network; obtaining convergence information about convergence at a gateway or the wireless local area network; and transmitting the convergence information to the base station.

A third program according to the present invention is a program for causing a processor to execute: transmitting, to a terminal apparatus through a wireless local area network, downlink data from a base station or receiving uplink data from a terminal apparatus through the wireless local area network; obtaining convergence information about convergence at a gateway or the wireless local area network; and transmitting the convergence information to the base station.

A third recording medium according to the present invention is a computer-readable non-transitory recording medium having recorded thereon a program for causing a processor to execute: transmitting, to a terminal apparatus through a wireless local area network, downlink data from a base station or receiving uplink data from a terminal apparatus through the wireless local area network; obtaining convergence information about convergence at a gateway or the wireless local area network; and transmitting the convergence information to the base station.

A fourth method according to the present invention includes receiving, from a gateway that is used for communication between a base station and a terminal apparatus through a wireless local area network, convergence information about convergence at the gateway or the wireless local area network.

A fourth program according to the present invention is a program for causing a processor to execute: receiving, from a gateway that is used for communication between a base station and a terminal apparatus through a wireless local area network, convergence information about convergence at the gateway or the wireless local area network.

A fourth recording medium according to the present invention is a computer-readable non-transitory recording medium having recorded thereon a program for causing a processor to execute: receiving, from a gateway that is used for communication between a base station and a terminal apparatus through a wireless local area network, convergence information about convergence at the gateway or the wireless local area network.

A fifth method according to the present invention includes receiving, from a gateway that is used for communication between a base station and a terminal apparatus through a wireless local area network, performance information about communication performance at the gateway or the wireless local area network; and measuring performance related to the gateway or the wireless local area network on the basis of the performance information.

A fifth program according to the present invention is a program for causing a processor to execute: receiving, from a gateway that is used for communication between a base station and a terminal apparatus through a wireless local area network, performance information about communication performance at the gateway or the wireless local area network; and measuring performance related to the gateway or the wireless local area network on the basis of the performance information.

A fifth recording medium according to the present invention is a computer-readable non-transitory recording medium having recorded thereon a program for causing a processor to execute: receiving, from a gateway that is used for communication between a base station and a terminal apparatus through a wireless local area network, performance information about communication performance at the gateway or the wireless local area network; and measuring performance related to the gateway or the wireless local area network on the basis of the performance information.

A sixth method according to the present invention includes transmitting, to a terminal apparatus through a wireless local area network, downlink data from a base station or receiving uplink data from a terminal apparatus through the wireless local area network; obtaining performance information about communication performance at a gateway or the wireless local area network; and transmitting the performance information to the base station.

A sixth program according to the present invention is a program for causing a processor to execute: transmitting, to a terminal apparatus through a wireless local area network, downlink data from a base station or receiving uplink data from a terminal apparatus through the wireless local area network; obtaining performance information about communication performance at a gateway or the wireless local area network; and transmitting the performance information to the base station.

A sixth recording medium according to the present invention is a computer-readable non-transitory recording medium having recorded thereon a program for causing a processor to execute: transmitting, to a terminal apparatus through a wireless local area network, downlink data from a base station or receiving uplink data from a terminal apparatus through the wireless local area network; obtaining performance information about communication performance at a gateway or the wireless local area network; and transmitting the performance information to the base station.

Advantageous Effects of Invention

According to the present invention, it will be possible to make an improvement on a case where data of a cellular network is transmitted and/or received through Wireless Local Area Network (WLAN). Note that the present invention may exert other advantageous effects instead of the above advantageous effect or together with the above advantageous effect.

DESCRIPTION OF THE EXAMPLE EMBODIMENTS

Example embodiments of the present invention (hereinafter, referred to as "the example embodiments") will be described in detail below with reference to the accompanying drawings. Note that, in the present specification and drawings, elements to which the same or similar descriptions are applicable are denoted by the same reference signs, whereby overlapping descriptions may be omitted.

Descriptions will be given in the following order.
1. Related Art
2. Overview of the Example Embodiments
3. Configuration of System According to the Example Embodiments
4. First Example Embodiment
 4.1. Configuration of Base Station
 4.2. Configuration of Gateway
 4.3. Technical Features
5. Second Example Embodiment
 5.1. Configuration of Base Station
 5.2. Configuration of Gateway
 5.3. Technical Features
6. Third Example Embodiment
 6.1. Configuration of Base Station
 6.2. Configuration of Gateway
 6.3. Technical Features 7. Fourth Example Embodiment
7.1. Configuration of Base Station
7.2. Configuration of Gateway
7.3. Technical Features
8. Fifth Example Embodiment
8.1. Configuration of Base Station
8.2. Configuration of Gateway
8.3. Technical Features
9. Sixth Example Embodiment
9.1. Configuration of Base Station
9.2. Configuration of Gateway
9.3. Technical Features 1. Related Art Reference is made to FIG. 1 to FIG. 4 to describe about LWIP as a technology that is related to the example embodiments.

At present, LWIP is under consideration in 3GPP as a data transfer scheme which utilizes both of eNB and Wireless Local Area Network Access Point (WLAN-AP).

LWIP in each of 3GPP Release 13 and Release 14 will be described below.

(1) Release 13

Figure 1:
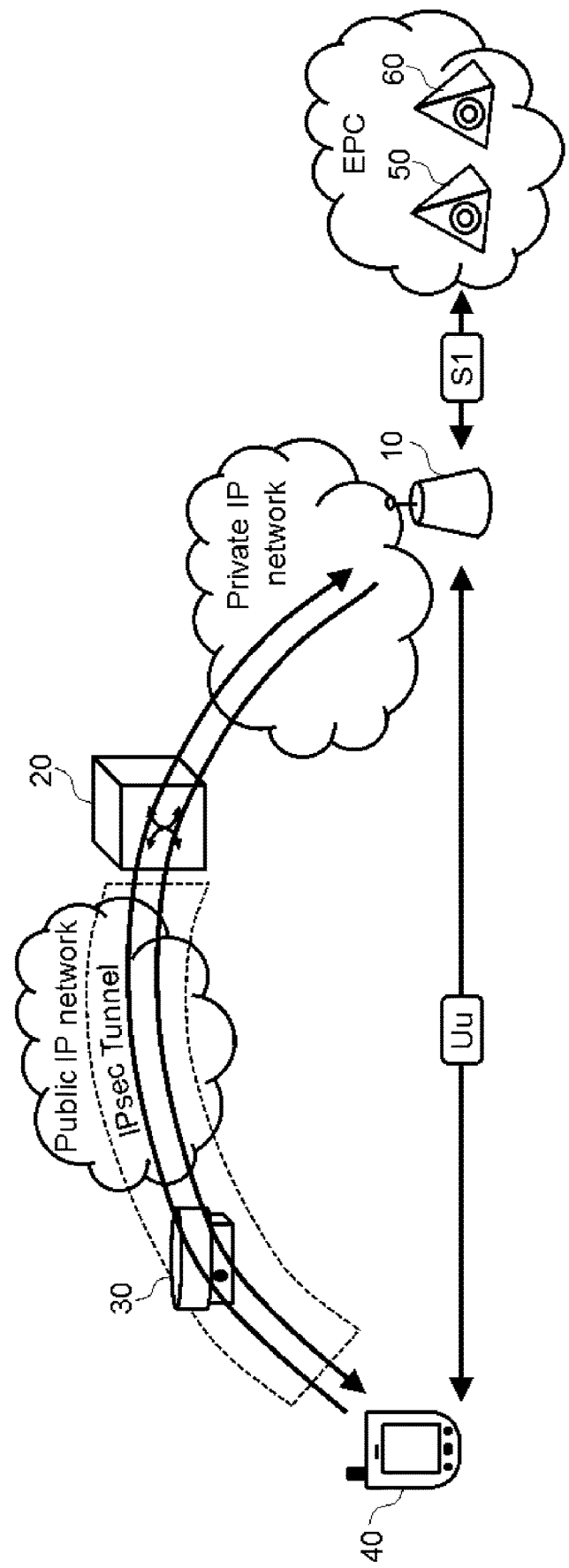
FIG. 1 is an explanatory diagram for describing an example of an LWIP network configuration assumed in 3GPP Release 13.

FIG. 1 is an explanatory diagram for describing an example of an LWIP network configuration assumed in 3GPP Release 13. Referring to FIG. 1, an eNB 10, an LWIP-Security Gateway (SeGW) 20, a WLAN-AP 30, a UE 40, a Mobility Management Entity (MME) 50 and a Serving Gateway (S-GW) 60 are illustrated. In LWIP, the eNB 10 and the UE 40 can transmit and/or receive data via Uu Interface and can transmit and/or receive data through the LWIP-SeGW 20 and the WLAN-AP 30 as well. The LWIP-SeGW 20 provides a Security Architecture for Internet Protocol (IPSec) tunnel for transmission and/or reception of data through WLAN.

Among others, in uplink, the UE 40 uses an LWIP function to add an LWIPEP header to uplink data transmitted through WLAN. The eNB 10 which receives the uplink data identifies, from the LWIPEP header, a bearer corresponding to the uplink data. As an example, the LWIPEP header includes a bearer ID.

Figure 2:
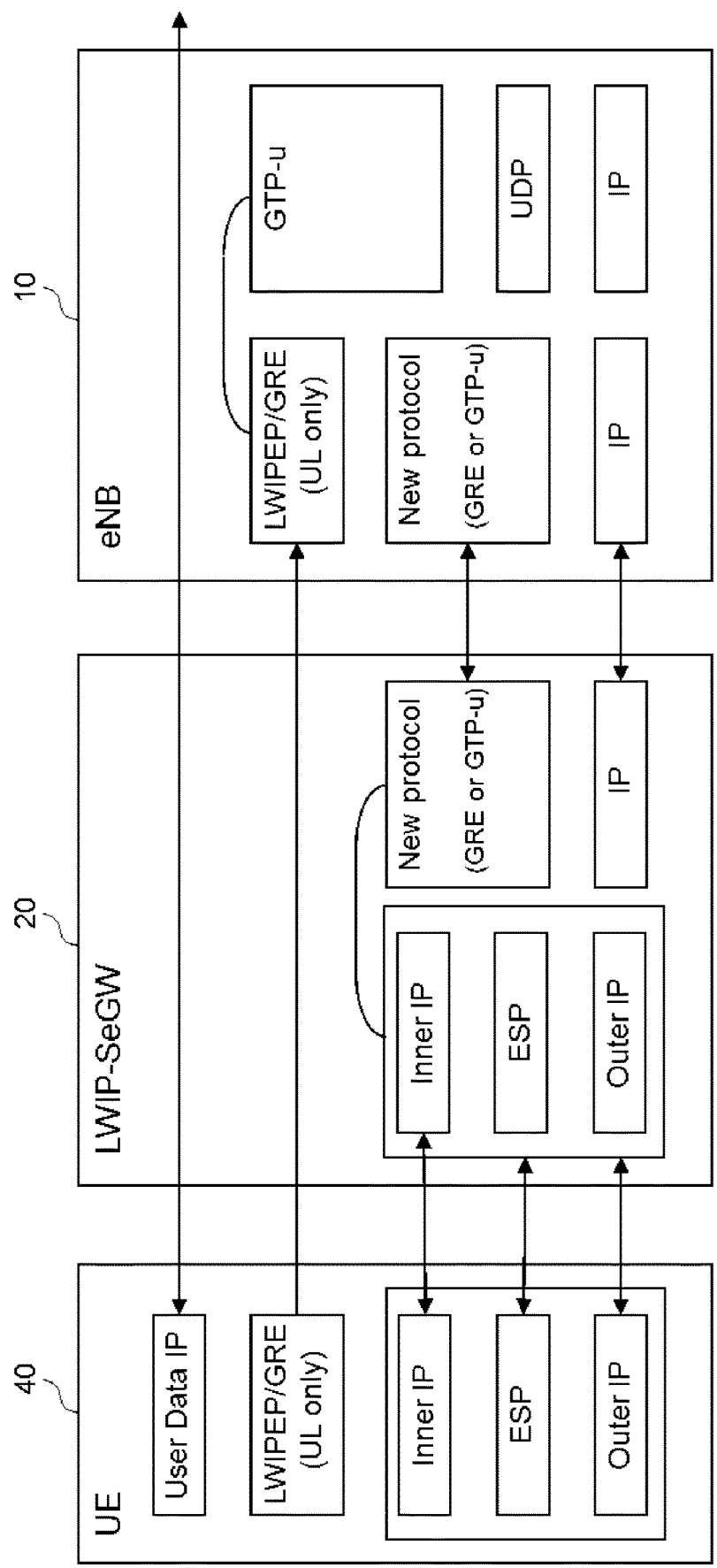
FIG. 2 is an explanatory diagram for describing an example of an LWIP protocol stack assumed in 3GPP Release 13.

FIG. 2 is an explanatory diagram for describing an example of an LWIP protocol stack assumed in 3GPP Release 13. Data is transmitted and/or received using Encapsulating Security Payload (ESP) between the LWIP-SeGW 20 and the UE 40. In addition, data is transmitted and/or received using a new protocol between the eNB 10 and the LWIP-SeGW 20. For example, the new protocol is Generic Routing Encapsulation (GRE) or GPRS Tunneling Protocol for User Plane (GTP-u), and User Datagram Protocol (UDP). A tunnel of this GRE or GTP-u is a tunnel per a user (that is, a key of GRE or a TEID of GTP-u is assigned per a user basis). Further, regarding uplink, uplink data is transmitted and/or received using LWIPEP between the eNB 10 and the UE 40. That is, the UE 40 adds an LWIPEP header to uplink data transmitted through WLAN. For example, LWIPEP may be implemented with GRE or GTP-u.

Note that an Inner IP may be further put onto LWIPEP of each of the eNB 10 and the UE 40 in the example of FIG. 2.

(2) Release 14

Figure 3:
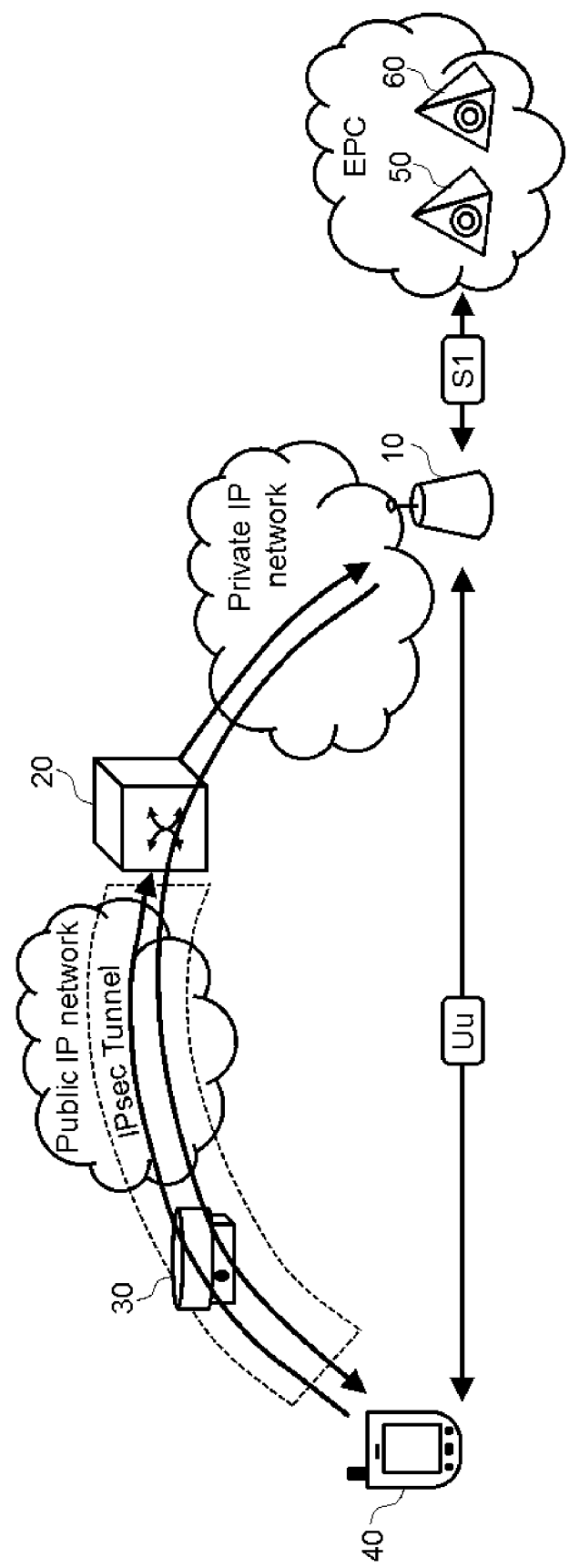
FIG. 3 is an explanatory diagram for describing an example of an LWIP network configuration assumed in 3GPP Release 14.

FIG. 3 is an explanatory diagram for describing an example of an LWIP network configuration assumed in 3GPP Release 14. Referring to FIG. 3, the eNB 10, the LWIP-SeGW 20, the WLAN-AP 30, the UE 40, the MME 50 and the S-GW 60 are illustrated. In LWIP, eNB 10 and UE 40 can transmit and/or receive data via Uu Interface and can transmit and/or receive data through LWIP-SeGW 20 and WLAN-AP 30 as well. LWIP-SeGW 20 provides an IPSec tunnel for transmission and/or reception of data through WLAN. These points are similar to those of Release 13.

Similarly to Release 13, in Release 14, a UE uses an LWIP function to add an LWIPEP header to uplink data transmitted through WLAN. Meanwhile, among others, in Release 14, unlike Release 13, the termination point of LWIPEP is not located at the eNB 10 but at the LWIP-SeGW 20. As such, the LWIP-SeGW 20 which receives the uplink data identifies a bearer corresponding to the uplink data from the LWIPEP header. Then, the LWIP-SeGW 20 transmits bearer information (for example, a bearer ID) along with uplink data to the eNB 10 via a newly-defined interface between the eNB 10 and the LWIP-SeGW 20.

Figure 4:
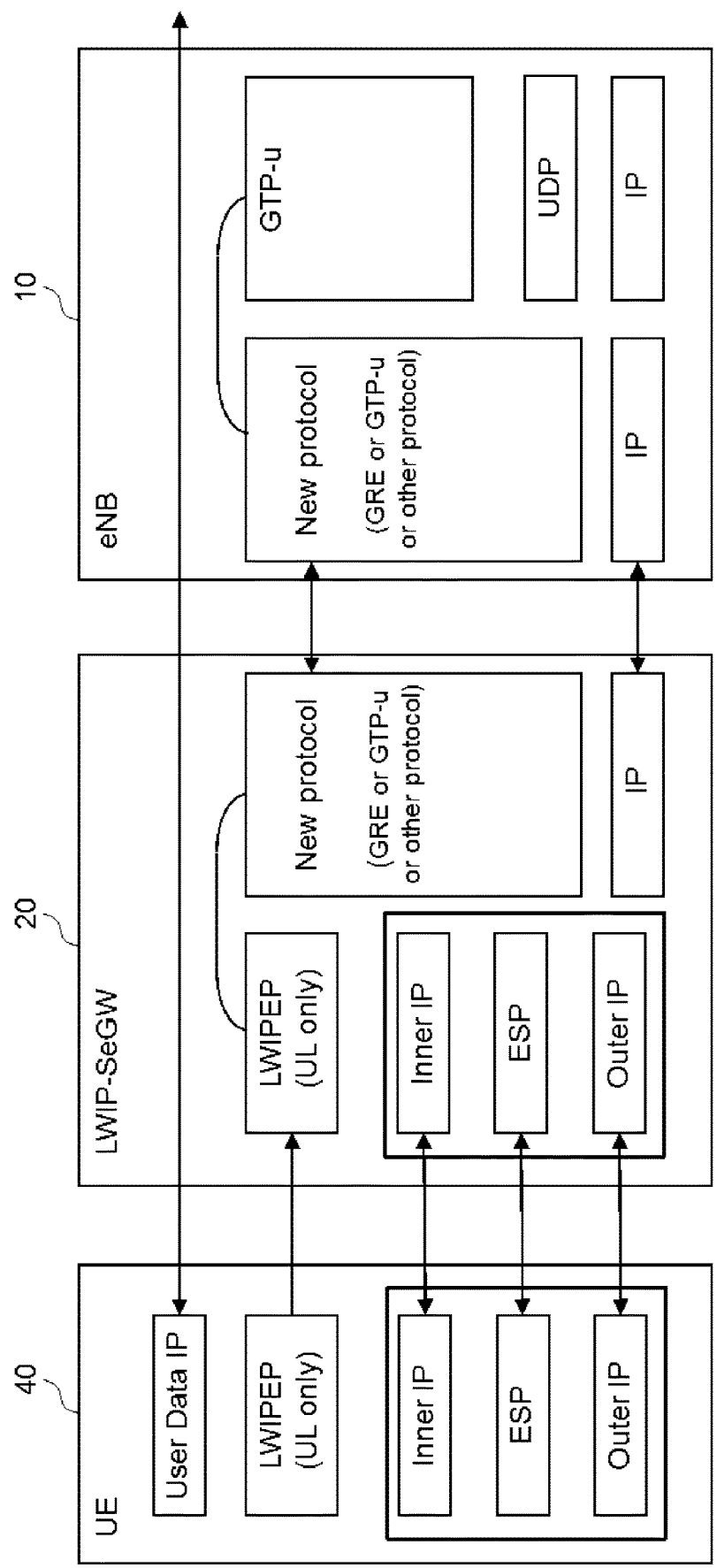
FIG. 4 is an explanatory diagram for describing an example of an LWIP protocol stack assumed in 3GPP Release 14.

FIG. 4 is an explanatory diagram for describing an example of an LWIP protocol stack assumed in 3GPP Release 14. Among others, in Release 14, uplink data is transmitted and/or received using LWIPEP between the LWIP-SeGW 20 and the UE 40. In addition, data is transmitted and/or received using a new protocol (for example, GRE or GTP-u, and UDP) between the eNB 10 and the LWIP-SeGW 20. Among others, the LWIP-SeGW 20 transmits bearer information (for example, a bearer ID) along with uplink data to the eNB 10.

Note that an Inner IP may be further put onto the new protocol of the eNB 10 and onto LWIPEP of the UE 40 in the example of FIG. 4.

2. Overview of the Example Embodiments

Next, an overview of the example embodiments is described.

(1) Technical Issues

Firstly, user data (downlink data or uplink data) has corresponding quality of service such as a Quality Class Indicator (QCI) and an Internet Protocol (IP) flow, but there has been no discussion in 3GPP about a technology for satisfying quality of service for user data to be transmitted and/or received between an eNB and an LWIP-SeGW. Thus, user data may be transmitted and/or received between an eNB and an LWIP-SeGW without considering quality of service. This may result in unsatisfied quality of service and lost stability of service provision when using LWIP.

Secondly, an eNB may transmit downlink data through an LWIP-SeGW and a WLAN without being aware of states of the LWIP-SeGW and the WLAN. Thus, there is a possibility that a data loss in downlink occurs due to convergence at the LWIP-SeGW or the WLAN.

Thirdly, there has been no discussion on how to know performance of communication by LWIP. Thus, it is not easy for an eNB to know performance of communication by LWIP and, as a result, it would be difficult to appropriately make a routing decision and/or design a network.

(2) Technical Features

In the example embodiments (the first example embodiment and the fourth example embodiment), for example, a base station (for example, an eNB) adds a header of a framing protocol (for example, GTP-u or GRE) to downlink data and transmits the downlink data to a gateway (for example, an LWIP-SeGW). Among others, the header includes identification information (TEID of GTP-u or a key of GRE) corresponding to quality of service (for example, a QCI or an IP flow) for the downlink data. This, for example, leads to a tunnel per quality of service and enables a base station to preferentially transmit downlink data having higher quality of service. As a result, quality of service is satisfied and stable services can be provided.

In the example embodiments (the second example embodiment and the fifth example embodiment), for example, a gateway (for example, an LWIP-SeGW) transmits, to a base station (for example, an eNB) convergence information about convergence at the gateway or a WLAN. This, for example, enables the base station to become aware of convergence at the gateway or the WLAN. Thus, the base station can avoid a data loss in downlink by suppressing or stopping transmission of downlink data through the WLAN.

In the example embodiments (the third example embodiment and the sixth example embodiment), for example, a base station (for example, an eNB) receives, from a gateway (for example, an LWIP-SeGW), performance information about communication performance at the gateway or a WLAN and measures performance on the basis of the performance information. This, for example, makes it possible to easily know the performance of communication through the WLAN and, as a result, appropriate routing decision and/or network design (for example, enlarging or shrinking the LWIP system) may become easier.

Note that the above-described technical features are concrete examples of the example embodiments, and the example embodiments are, of course, not limited to the above-described technical features.

3. Configuration of System According to the Example Embodiments

Figure 5:
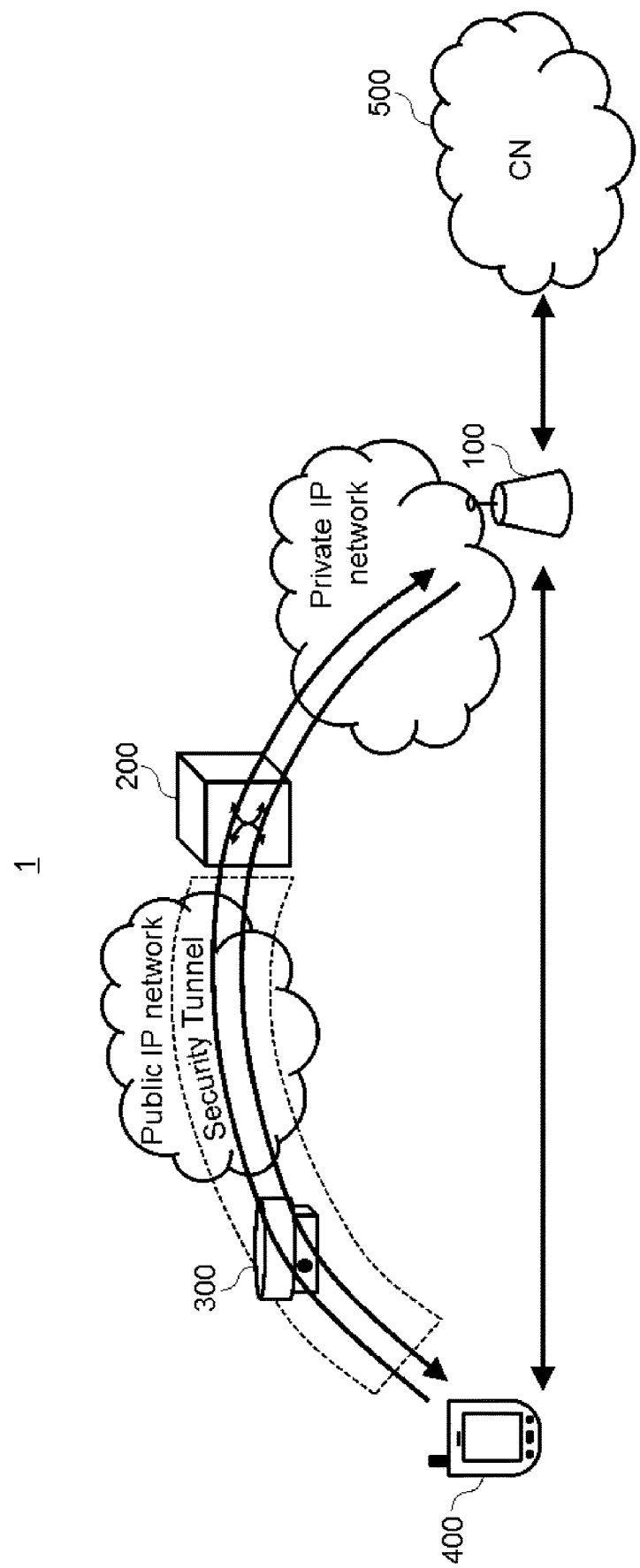
FIG. 5 is an explanatory diagram illustrating an example of a schematic configuration of a system according to example embodiments.

An example of a configuration of a system 1 according to the example embodiments are described with reference to FIG. 5 to FIG. 8. FIG. 5 is an explanatory diagram illustrating an example of a schematic configuration of the system 1 according to the example embodiments. Referring to FIG. 5, the system 1 includes a base station 100, a gateway 200, a WLAN-AP 300, a terminal apparatus 400 and a core network 500.

For example, the system 1 is a system that conforms to a 3GPP standard. More specifically, the system 1 may be a system that conforms to LTE/LTE-Advanced and/or System Architecture Evolution (SAE). Alternatively, the system 1 may be a system that conforms to a fifth generation (5G) standard. The system 1 is, of course, not limited to these examples.

(1) Base Station 100

The base station 100 is a node which performs wireless communication with terminal apparatuses and, in other words, is a Radio Access Network (RAN) node. For example, the base station 100 may be an evolved Node B (eNB) or a generation Node B (gNB) in 5G. The base station 100 may include a plurality of units (or a plurality of nodes). The plurality of units (or plurality of nodes) may include a first unit (or first node) for performing processing of a higher protocol layer and a second unit (or second node) for performing processing of a lower protocol layer. As an example, the first unit may be referred to as Center/Central Unit (CU) and the second unit may be referred to as Distributed Unit (DU) or Access Unit (AU). As another example, the first unit may be referred to as Digital Unit (DU) and the second unit may be referred to as Radio Unit (RU) or Remote Unit (RU). The Digital Unit (DU) may be a Base Band Unit (BBU) and the RU may be a Remote Radio Head (RRH) or a Remote Radio Unit (RRU). Of course, the names of the first unit (or first node) and the second unit (or second node) are not limited to such examples. Alternatively, the base station 100 may be a single unit (or single node). In this case, the base station 100 may be one of the plurality of units (for example, one of the first and second units) and may be connected to another unit of the plurality of units (for example, the other one of the first and second units).

Among others, in the example embodiments, the base station 100 can transmit and receive data to and from the terminal apparatus 400 wirelessly (for example, via the Uu interface) and can transmit and receive data to and from the terminal apparatus 400 through the gateway 200 and the WLAN-AP 300 as well. Specifically, for example, the base station 100 can carry out operations of LWIP.

(2) Gateway 200

The gateway 200 is a node located between the base station 100 and the WLAN-AP 300 and the terminal apparatus 400 and supports transmission and reception of data through the WLAN-AP 300.

For example, the gateway 200 is a security gateway and ensures security for transmission and reception of data through WLAN. For example, the gateway 200 provides a security tunnel (for example, an IPsec tunnel) for transmission and reception of data through WLAN. More specifically, for example, the gateway 200 is an LWIP-SeGW.

(3) WLAN-AP 300

The WLAN AP 300 is an access point of WLAN and performs wireless communication with terminal apparatuses (for example, the terminal apparatus 400) in accordance with one or more of IEEE 802.11 series (such as IEEE 802.11b/11a/11g/11n/11ac).

(4) Terminal Apparatus 400

The terminal apparatus 400 performs wireless communication with a base station. For example, the terminal apparatus 400 performs wireless communication with the base station 100 when it is located within the coverage area of the base station 100. For example, the terminal apparatus 400 is a User Equipment (UE).

Among others, in the example embodiments, the terminal apparatus 400 can transmit and receive data to and from the base station 100 wirelessly (for example, via Uu Interface) and can transmit and receive data to and from the base station 100 through the WLAN-AP 300 and the gateway 200 as well. Specifically, for example, the terminal apparatus 400 can carry out operations of LWIP.

(5) Core Network 500

The core network 500 includes one or more core network nodes which communicates with the base station 100. For example, the core network 500 includes a first core network node that is responsible for control plane processing and a second core network node that is responsible for user plane processing. More specifically, for example, the core network 500 is an Evolved Packet Core (EPC), the first core network node is an MME and the second core network node is an S-GW.

(6) Protocol Stack

For example, LWIP is used in the system 1. In this case, there are some possible examples as LWIP protocol stack for the base station 100 (eNB), the gateway 200 (LWIP-SeGW) and the terminal apparatus 400 (UE). The first to third examples of the protocol stack are now described.

Figure 6:
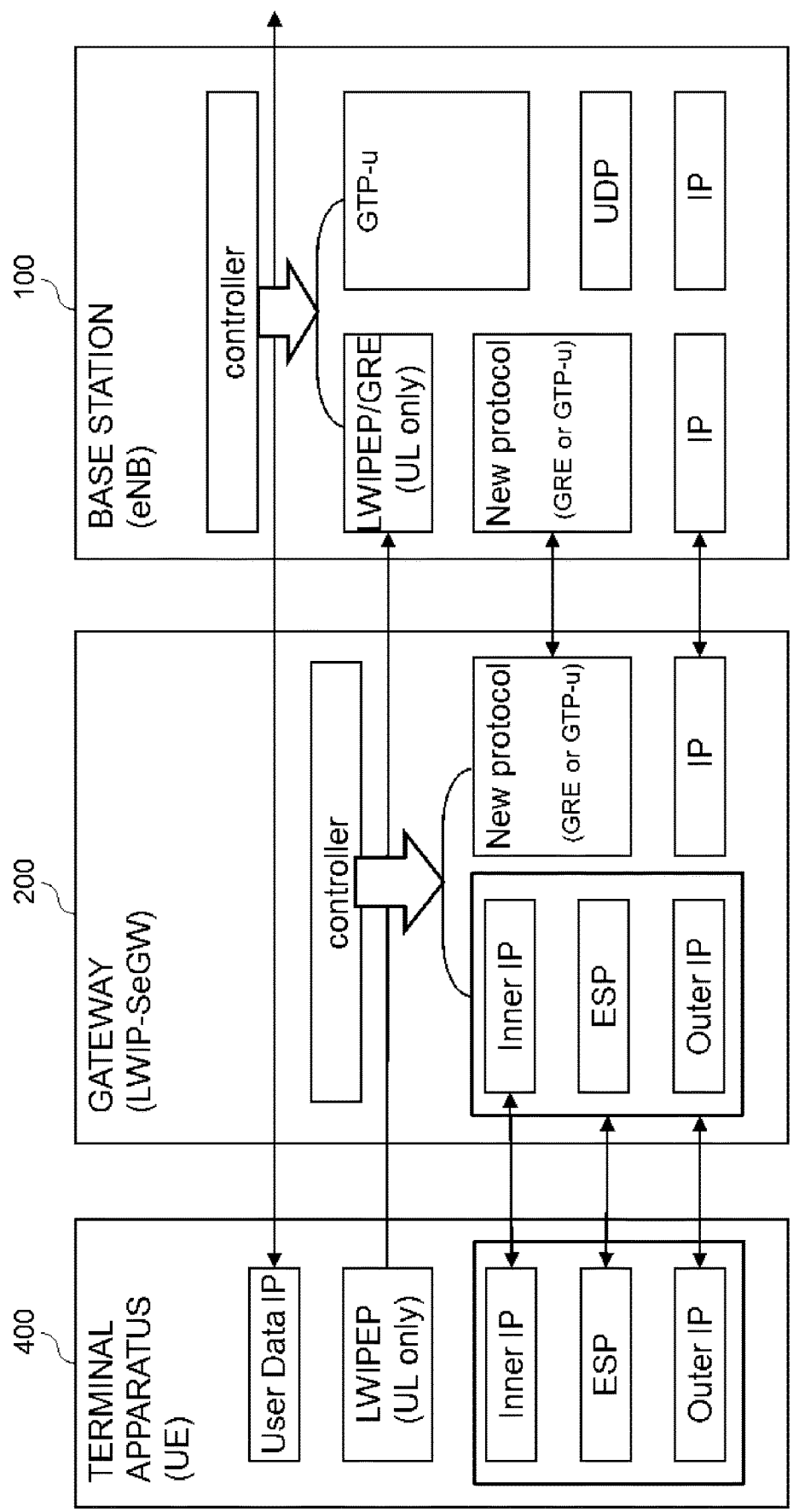
FIG. 6 is an explanatory diagram for describing a first example of an LWIP protocol stack in the example embodiments.

FIG. 6 is an explanatory diagram for describing a first example of an LWIP protocol stack in the example embodiments. In this first example, the protocols are arranged similarly to the example of the protocol stack of Release 13 as described with reference to FIG. 2. In the first example, a controller for performing LWIP-related control may further be arranged in the base station 100 (eNB) and the gateway 200 (LWIP-SeGW).

Figure 7:
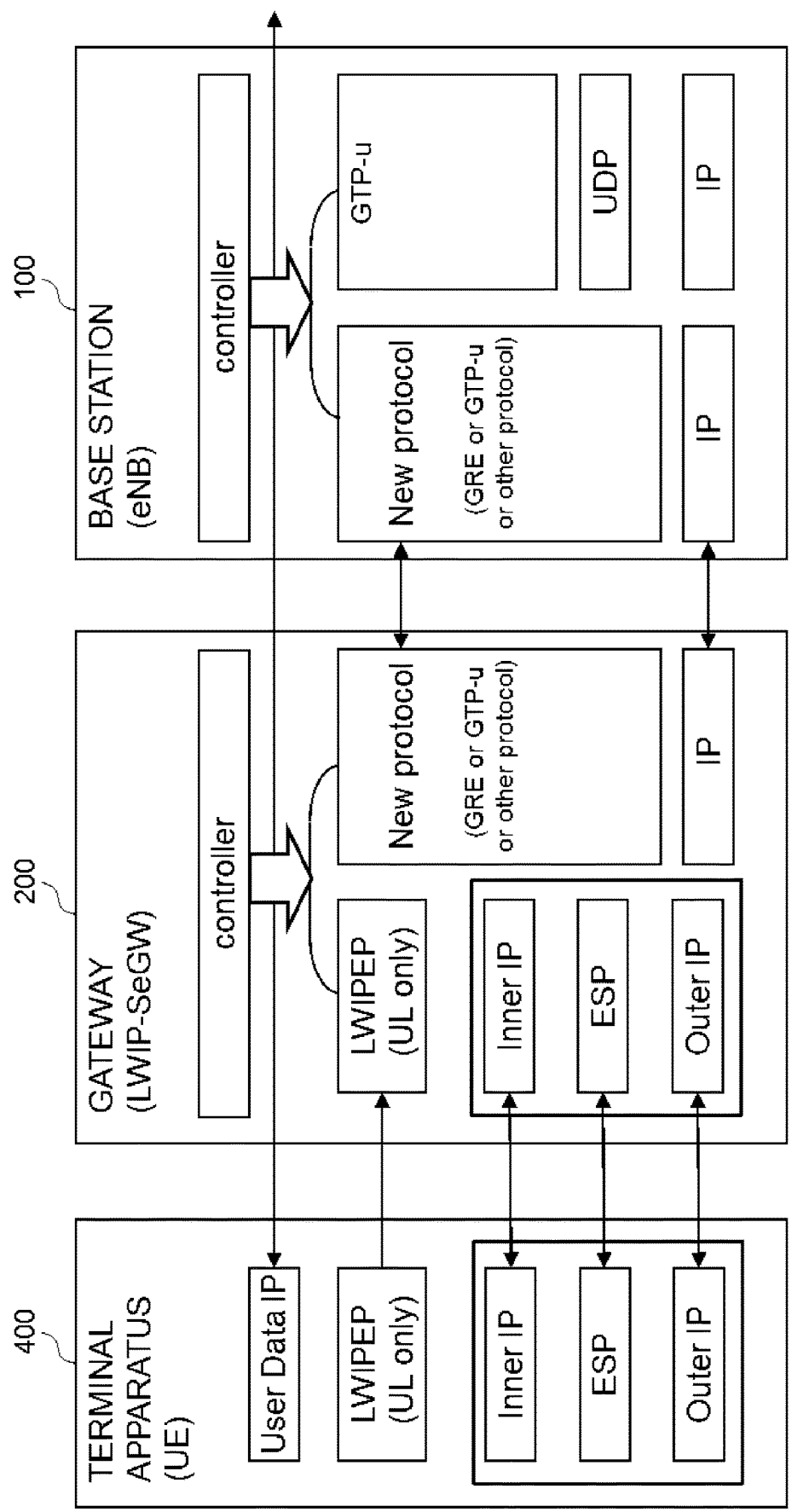
FIG. 7 is an explanatory diagram for describing a second example of an LWIP protocol stack in the example embodiments.

FIG. 7 is an explanatory diagram for describing a second example of an LWIP protocol stack in the example embodiments. In this second example, the protocols are arranged similarly to the example of the protocol stack of Release 14 as described with reference to FIG. 4. In the second example, a controller for performing LWIP-related control may further be arranged in the base station 100 (eNB) and the gateway 200 (LWIP-SeGW).

Figure 8:
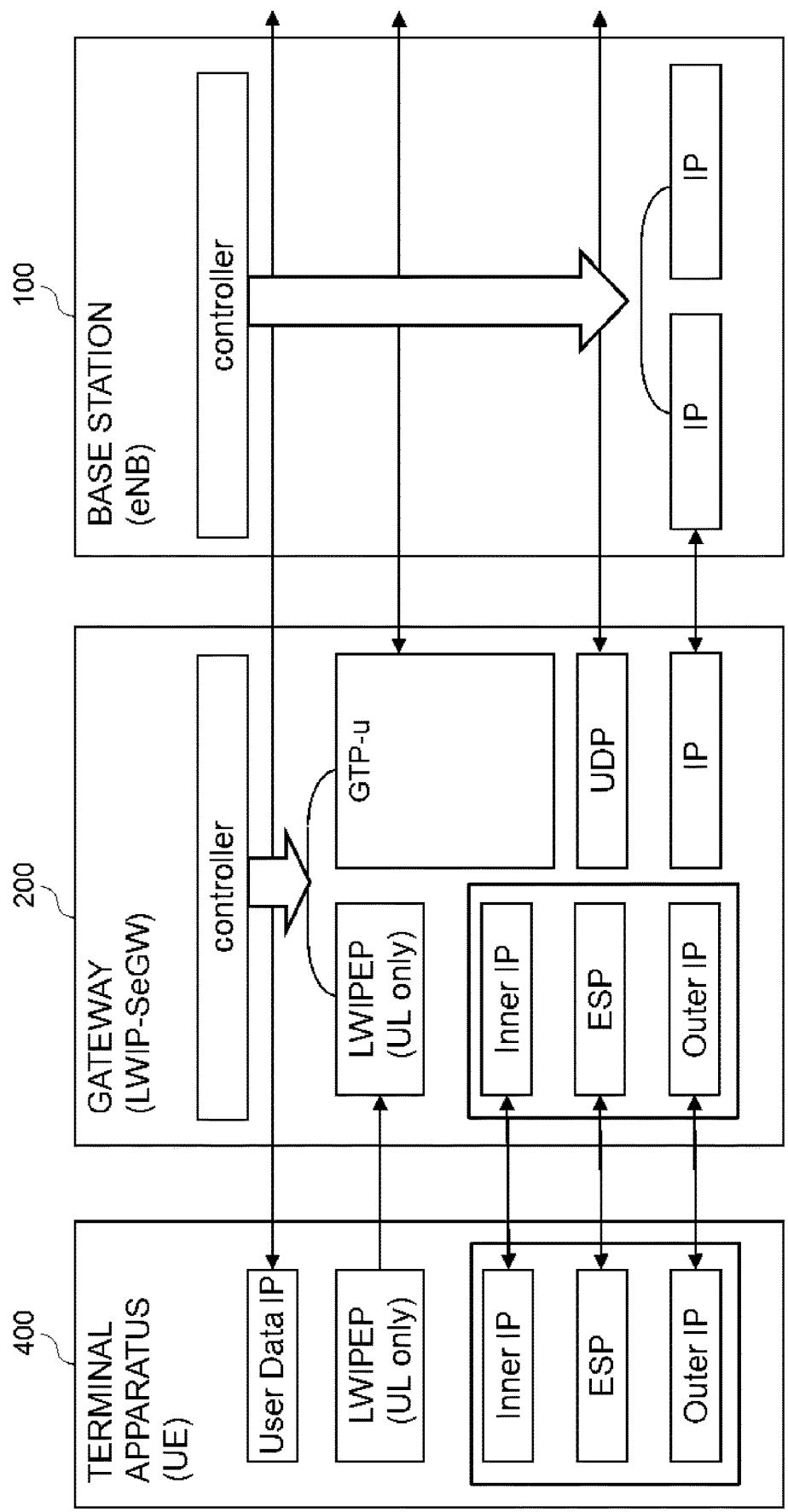
FIG. 8 is an explanatory diagram for describing a third example of an LWIP protocol stack in the example embodiments.

FIG. 8 is an explanatory diagram for describing a third example of an LWIP protocol stack in the example embodiments. In this third example, the termination point of S1-*u* (GTP-u) is changed from the base station 100 (eNB) to the gateway 200 (LWIP-SeGW). This may reduce overhead of traffic offload.

Note that, in the case of the example of FIG. 8, issuance of a key of GTP-u or GRE that the base station 100 (eNB) exchanges with a core network node and bearer resource management is carried out by one of the base station 100 (eNB) and the gateway 200 (LWIP-SeGW). In this case, the one of the base station 100 (eNB) and the gateway 200 (LWIP-SeGW) may transmit information (for example, the key of GTP-u or GRE, resource information and the like) to the other. In addition, one of the base station 100 (eNB) and the gateway 200 (LWIP-SeGW) may provide the other with instructions to release resources.

4. First Example Embodiment

Next, a first example embodiment of the present invention will be described with reference to FIG. 9 to FIG. 12.

4.1. Configuration of Base Station

Figure 9:
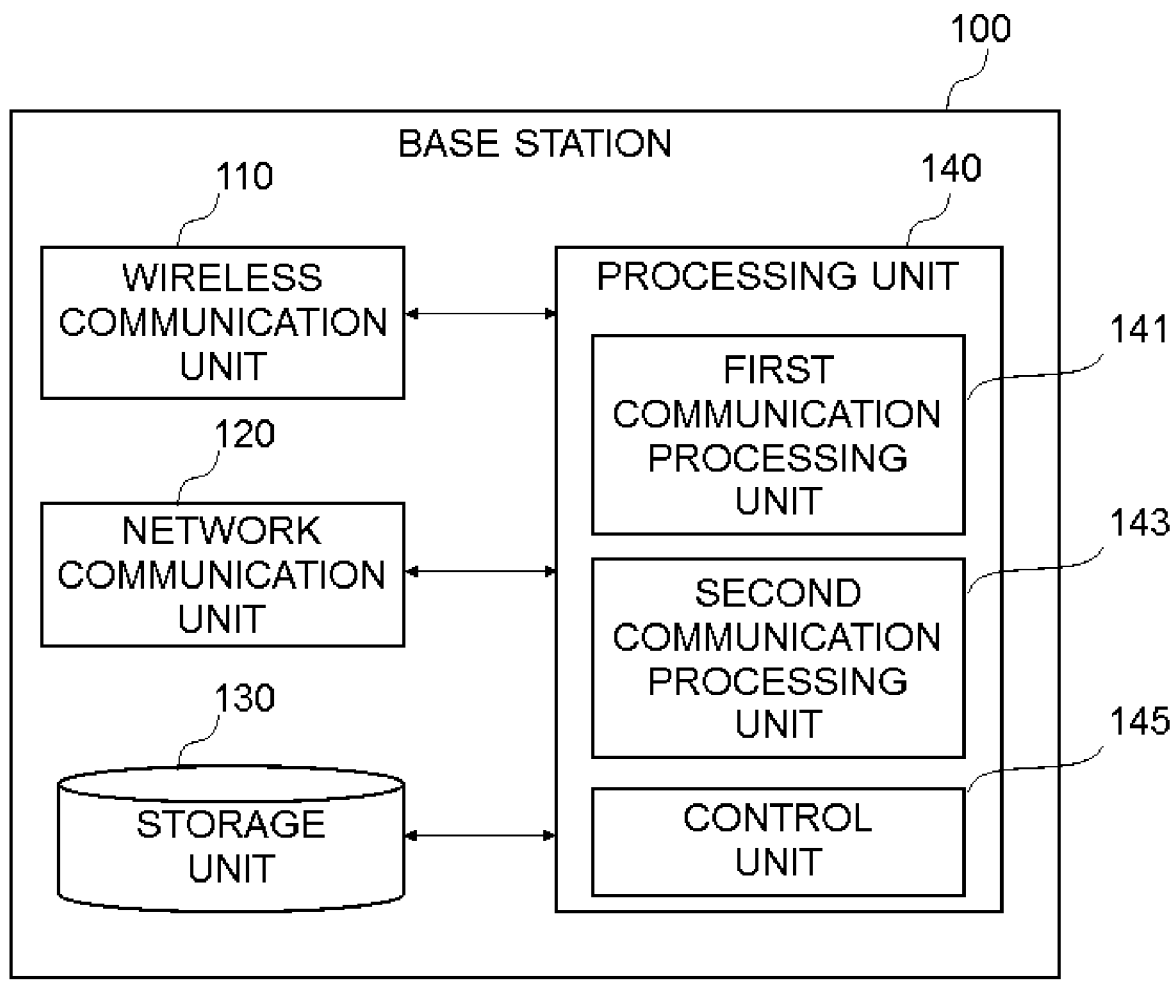
FIG. 9 is a block diagram illustrating an example of a schematic configuration of a base station according to a first example embodiment.

First, an example of a configuration of the base station 100 according to the first example embodiment is described with reference to FIG. 9. FIG. 9 is a block diagram illustrating an example of a schematic configuration of the base station 100 according to the first example embodiment. Referring to FIG. 9, the base station 100 includes a wireless communication unit 110, a network communication unit 120, a storage unit 130 and a processing unit 140.

(1) Wireless Communication Unit 110

The wireless communication unit 110 is configured to wirelessly transmit and receive signals. For example, the wireless communication unit 110 receives a signal from a terminal apparatus and transmits a signal to a terminal apparatus.

(2) Network Communication Unit 120

The network communication unit 120 is configured to receive signals from the network and transmit signals to the network.

(3) Storage Unit 130

The storage unit 130 is configured to store programs and parameters for operation of the base station 100 as well as various data temporarily or permanently.

(4) Processing Unit 140

The processing unit 140 is configured to provide various functions of the base station 100. The processing unit 140 includes a first communication processing unit 141, a second communication processing unit 143 and a control unit 145. Note that the processing unit 140 may further include another constituent element than these constituent elements. That is, the processing unit 140 may perform operations other than the operations of these constituent elements.

Specific actions of the first communication processing unit 141, the second communication processing unit 143 and the control unit 145 will be described in detail later.

For example, the processing unit 140 communicates with terminal apparatuses (for example, the terminal apparatus 400) via the wireless communication unit 110. For example, the processing unit 140 communicates with other network nodes (for example, the gateway 200, core network nodes or the like) via the network communication unit 120. Specifically, for example, the processing unit 140 (the first communication processing unit 141 and the second communication processing unit 143) communicates with the gateway 200 via the network communication unit 120.

As an example, the first communication processing unit 141 performs processing of the upper layer protocols (for example, GRE or GTP-u) among the new protocols in FIG. 6 or FIG. 7. The second communication processing unit 143 performs processing of the lower layer protocols (for example, UDP) among the new protocols and IP. In addition, the control unit 145 acts as a controller illustrated in FIG. 6 or FIG. 7.

(5) Implementation Examples

The wireless communication unit 110 may be implemented with an antenna, a high frequency (Radio Frequency (RF)) circuit and the like. The network communication unit 120 may be implemented with a network adapter, a network interface card or the like. The storage unit 130 may be implemented with a memory (for example, non-volatile memory and/or volatile memory), hard disc and/or the like. The processing unit 140 may be implemented with a Base Band (BB) processor, another processor and/or the like. The first communication processing unit 141, the second communication processing unit 143 and the control unit 145 may be implemented with the same processor or with respective different processors. The above memory (the storage unit 130) may be included in such a processor (a chip).

The base station 100 may include a memory that stores programs and one or more processors that are capable of executing the programs and the one or more processors may execute the operations of the processing unit 140 (operations of the first communication processing unit 141, the second communication processing unit 143 and the control unit 145). The programs may be programs for causing the one or more processors to execute the operations of the processing unit 140 (operations of the first communication processing unit 141, the second communication processing unit 143 and the control unit 145).

4.2. Configuration of Gateway

Figure 10:
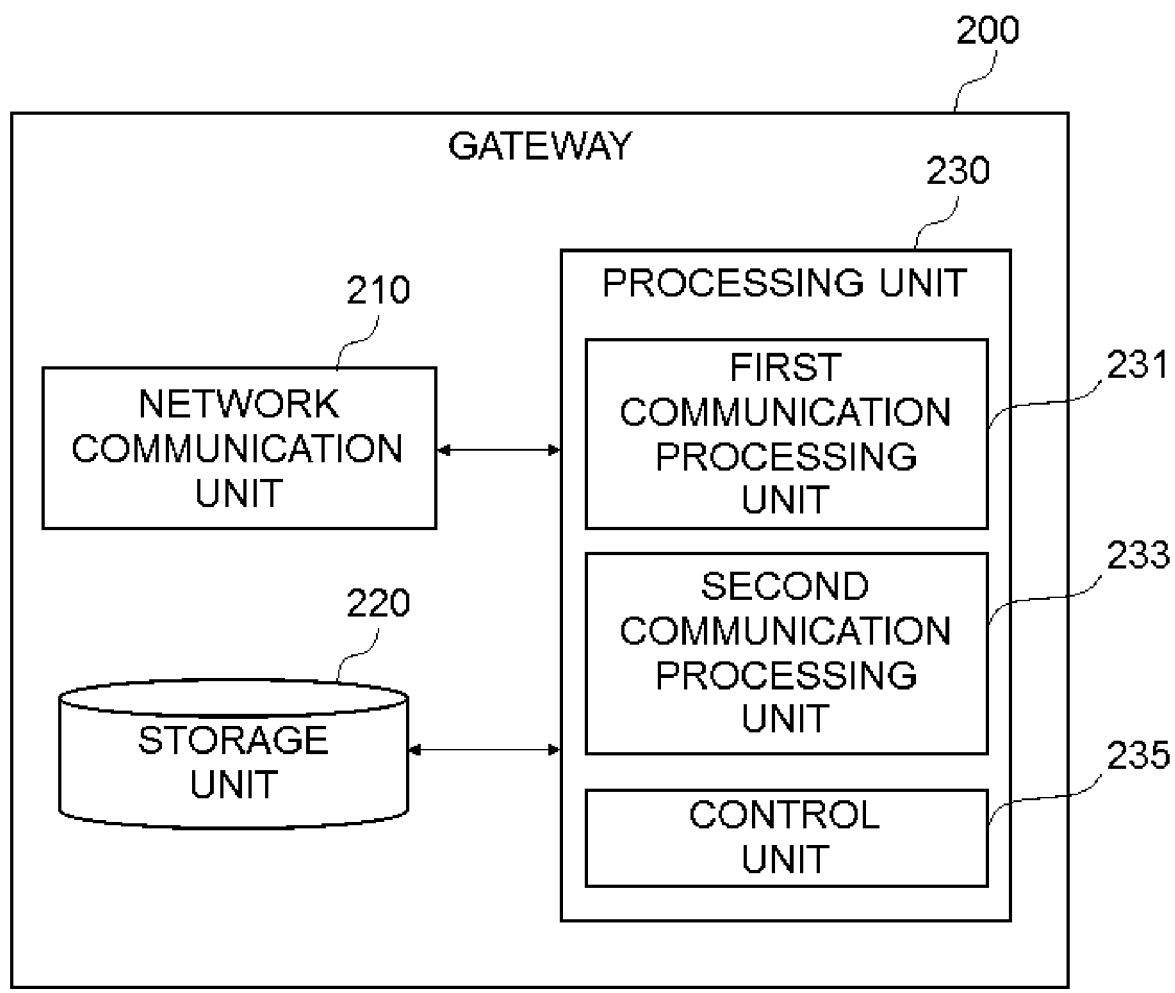
FIG. 10 is a block diagram illustrating an example of a schematic configuration of a gateway according to the first example embodiment.

Next, an example of a configuration of the gateway 200 according to the first example embodiment is described with reference to FIG. 10. FIG. 10 is a block diagram illustrating an example of a schematic configuration of the gateway 200 according to the first example embodiment. Referring to FIG. 10, the gateway 200 includes a network communication unit 210, a storage unit 220 and a processing unit 230.

(1) Network Communication Unit 210

The network communication unit 210 is configured to receive signals from the network and transmit signals to the network.

(2) Storage Unit 220

The storage unit 220 is configured to store programs and parameters for operation of the gateway 200 as well as various data temporarily or permanently.

(3) Processing Unit 230

The processing unit 230 is configured to provide various functions of the gateway 200. The processing unit 230 includes a first communication processing unit 231, a second communication processing unit 233 and a control unit 235. Note that the processing unit 230 may further include another constituent element than these constituent elements. That is, the processing unit 230 may perform operations other than the operations of these constituent elements. Specific actions of the first communication processing unit 231, the second communication processing unit 233 and the control unit 235 will be described in detail later.

For example, the processing unit 230 communicates with other nodes (for example, the base station 100, the terminal apparatus 400 or core network nodes) via the network communication unit 210. Specifically, for example, the processing unit 230 (the first communication processing unit 231 and the second communication processing unit 233) communicates with the base station 100 (or core network nodes) via the network communication unit 210. In addition, for example, the processing unit 230 communicate with the terminal apparatus 400 via the network communication unit 210 through WLAN (the WLAN-AP 300).

As an example, the first communication processing unit 231 performs processing of the upper layer protocols (for example, GRE or GTP-u) among the new protocols in FIG. 6 or FIG. 7 or processing of GTP-u in FIG. 8. The second communication processing unit 233 performs processing of the lower layer protocols (for example, UDP) among the new protocols and IP in FIG. 6 or FIG. 7 or processing of UDP and IP in FIG. 8. In addition, the control unit 235 acts as a controller illustrated in FIG. 6, FIG. 7 or FIG. 8.

(4) Implementation Examples

The network communication unit 210 may be implemented with a network adapter, a network interface card or the like. The storage unit 220 may be implemented with a memory (for example, non-volatile memory and/or volatile memory), hard disc and/or the like. The processing unit 230 may be implemented with a processor or the like. The first communication processing unit 231, the second communication processing unit 233 and the control unit 235 may be implemented with the same processor or with respective different processors. A memory (the storage unit 220) may be included in such a processor (a chip).

The gateway 200 may include a memory that stores programs and one or more processors that are capable of executing the programs and the one or more processors may execute the operations of the processing unit 230 (operations of the first communication processing unit 231, the second communication processing unit 233 and the control unit 235). The programs may be programs for causing the one or more processors to execute the operations of the processing unit 230 (operations of the first communication processing unit 231, the second communication processing unit 233 and the control unit 235).

4.3. Technical Features

Figure 11:
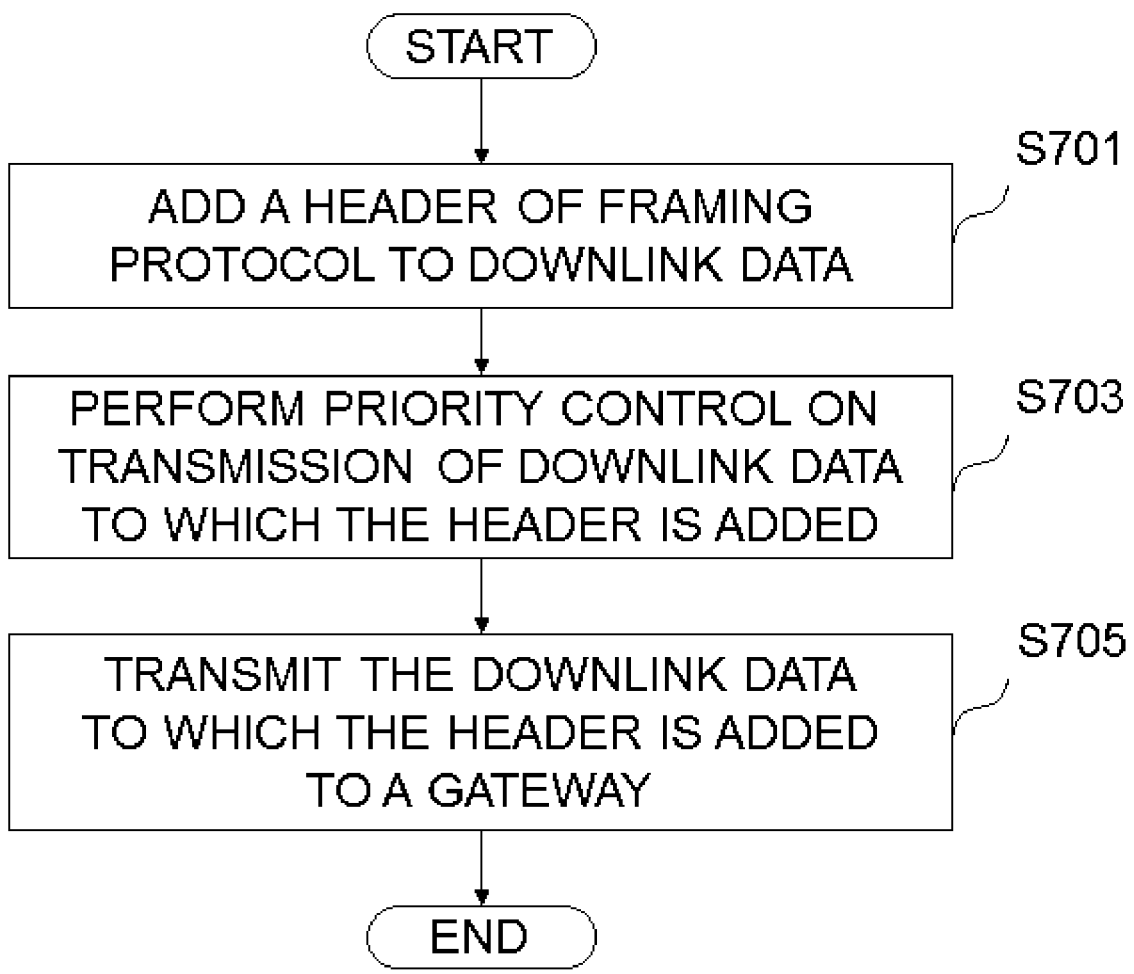
FIG. 11 is a flow chart for describing an example of a schematic flow of a process in a base station according to the first example embodiment.
Figure 12:
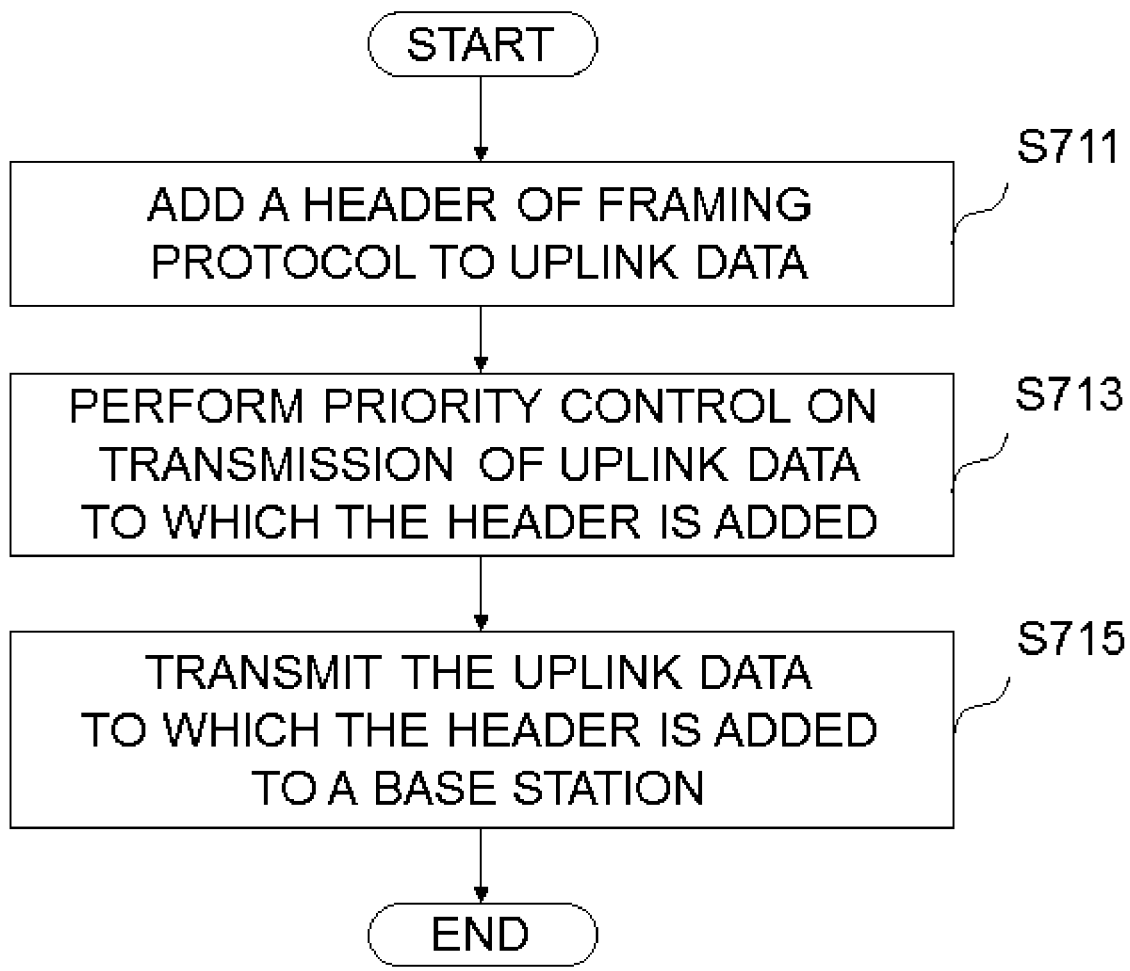
FIG. 12 is a flow chart for describing an example of a schematic flow of a process in a gateway according to the first example embodiment.

Next, with reference to FIG. 11 and FIG. 12, technical features of the first example embodiment are described.

(1) Technical Features Related to Downlink

The base station 100 (the first communication processing unit 141) adds a header of a framing protocol to downlink data transmitted to the terminal apparatus 400. Then, the base station 100 (the second communication processing unit 143) transmits the downlink data to which the header is added to the gateway 200. Note that the gateway 200 is used for transmission from the base station 100 to the terminal apparatus 400 through WLAN.

(1-1) Framing Protocol

The framing protocol is a protocol for communication between the base station 100 and the gateway 200.

For example, the framing protocol is a tunneling protocol. More specifically, for example, the framing protocol is GTP-u. Alternatively, the framing protocol may be GRE.

(1-2) Header and Identification Information

The header includes identification information corresponding to quality of service for the downlink data. The identification information may not be information for identifying the quality of service itself but is information which enables the quality of service to be identified.

As a first example, the quality of service is a QCI for the downlink data and the identification information is identification information for identifying a bearer for the downlink data. The bearer has the QCI. As a second example, the quality of service may be an IP flow and the identification information may be identification information corresponding to the IP flow. However, the quality of service is not limited to these examples.

For example, the framing protocol is GTP-u and the identification information is a TEID of GTP-u. Alternatively, the framing protocol may be GRE and the identification information may be a key of GRE.

In general, the TEID of GTP-u and the key of GRE is information for identifying a bearer and corresponds to a QCI of the bearer but, in a case where the quality of service is an IP flow, the identification information (the TEID of GTP-u and the key of GRE) may be assigned such that it corresponds to the IP flow (that is, such that identification of the IP flow becomes possible).

As described above, the header added to the downlink data includes the identification information corresponding to the quality of service. This, for example, leads to a tunnel per quality of service and enables the base station 100 to preferentially transmit downlink data having higher quality of service. As a result, quality of service is satisfied and stable services can be provided.

Note that the header may further include other information. Such other information may be information for identifying the WLAN (the WLAN-AP 300) or the terminal apparatus 400.

(1-3) Priority Control

For example, the base station 100 (the control unit 145) performs priority control on transmission of the downlink data to which the header is added on the basis of the identification information corresponding to the quality of service. The priority control may be referred to as flow control.

For example, the priority control includes queueing or traffic shaping for the downlink data to which the header is added. That is, the base station 100 (the control unit 145) performs queueing or traffic shaping for the downlink data to which the header is added on the basis of the identification information corresponding to the quality of service. Specifically, for example, the base station 100 (the control unit 145) transmits downlink data having a higher quality of service preferentially (earlier than the others) by queueing (for example, Weighted Round Robin (WRR), Weighted Fair Queuing (WFQ) or the like) or traffic shaping.

The priority control may include determination of a Differentiated Service Code Point (DSCP) value in an IP header added to the downlink data to which the header is added. That is, the base station 100 (the control unit 145) may determine the DSCP value on the basis of the identification information corresponding to the quality of service. Specifically, for example, a mapping between a quality of service (for example, a QCI or an IP flow) and a DSCP value may be predefined and the base station 100 (the control unit 145) may determine a DSCP value such that the DSCP value in the IP header corresponds to the quality of service for the downlink data.

The priority control may include selection of the gateway from among a plurality of gateways. That is, the base station 100 (the control unit 145) may select the gateway from among a plurality of gateways on the basis of the identification information corresponding to the quality of service. Specifically, for example, the base station 100 (the control unit 145) may select a more suitable gateway (for example, a gateway with no convergence, a gateway having higher communication performance or the like) for transmission of downlink data having a higher quality of service.

As described above, for example, priority control is performed on the basis of the identification information. This enables, for example, the base station 100 to indeed preferentially transmit downlink data having higher quality of service. As a result, quality of service is satisfied and stable services can be provided.

(1-4) Process Flow

FIG. 11 is a flow chart for describing an example of a schematic flow of a process in the base station 100 according to the first example embodiment.

The base station 100 (the first communication processing unit 141) adds a header of a framing protocol to downlink data transmitted to the terminal apparatus 400 (S701).

The base station 100 (the control unit 145) performs priority control on transmission of the downlink data to which the header is added on the basis of the identification information corresponding to the quality of service (S703).

The base station 100 (the second communication processing unit 143) transmits the downlink data to which the header is added to the gateway 200 (S705). After that, the gateway 200 may transmit the downlink data to the terminal apparatus 400. Information transmitted by the gateway 200 to the terminal apparatus 400 may include the public IP address of the gateway 200 as the source IP address and may include the local IP address of the terminal apparatus 400 as the destination IP address.

(2) Technical Features Related to Uplink

The gateway 200 (the first communication processing unit 231) adds a header of a framing protocol to uplink data transmitted by the terminal apparatus 400 through WLAN. Then, the gateway 200 (the second communication processing unit 233) transmits the uplink data to which the header is added to the base station 100.

(2-1) Framing Protocol

The framing protocol is a protocol for communication between the gateway 200 and the base station 100.

For example, the framing protocol is a tunneling protocol. More specifically, for example, the framing protocol is GTP-u. Alternatively, the framing protocol may be GRE.

(2-2) Header and Identification Information

The header includes identification information corresponding to quality of service for the uplink data. The identification information may not be information for identifying the quality of service itself but is information which enables the quality of service to be identified.

As a first example, the quality of service is a QCI for the uplink data and the identification information is identification information for identifying a bearer for the uplink data. The bearer has the QCI. As a second example, the quality of service may be an IP flow and the identification information may be identification information corresponding to the IP flow. However, the quality of service is not limited to these examples.

For example, the framing protocol is GTP-u and the identification information is a TEID of GTP-u. Alternatively, the framing protocol may be GRE and the identification information may be a key of GRE.

In general, the TEID of GTP-u and the key of GRE is information for identifying a bearer and corresponds to a QCI of the bearer but, in a case where the quality of service is an IP flow, the identification information (the TEID of GTP-u and the key of GRE) may be assigned such that it corresponds to the IP flow (that is, so as to make it possible to identify the IP flow).

For example, the identification information is information included in the uplink data or information transmitted by the terminal apparatus 400 along with the uplink data. More specifically, for example, the identification information is included in an LWIPEP header. As an example, the first example illustrated in FIG. 6 is used as an LWIP protocol stack and the uplink data transmitted by the gateway 200 includes an LWIPEP header, which includes the identification information. As another example, the second example illustrated in FIG. 7 or the third example illustrated in FIG. 8 may be used as an LWIP protocol stack and the uplink data transmitted by the gateway 200 may be transmitted by the terminal apparatus 400 along with a LWIP header, which may include the identification information. This, for example, enables the gateway 200 to obtain the identification information. Information transmitted by the terminal apparatus 400 to the gateway 200 may include the local IP address of the terminal apparatus 400 as the source IP address and may include the public IP address of the gateway 200 as the destination IP address.

As described above, the header added to the uplink data includes the identification information corresponding to the quality of service. This, for example, leads to a tunnel per quality of service and enables the gateway 200 to preferentially transmit uplink data having higher quality of service. As a result, quality of service is satisfied and stable services can be provided.

Note that the header may further include other information. Such other information may be information for identifying the WLAN (the WLAN-AP 300) or the terminal apparatus 400.

(2-3) Priority Control

For example, the gateway 200 (the control unit 235) performs priority control on transmission of the uplink data to which the header is added on the basis of the identification information corresponding to the quality of service. The priority control may be referred to as flow control.

For example, the priority control includes queueing or traffic shaping for the uplink data to which the header is added. That is, the gateway 200 (the control unit 235) performs queueing or traffic shaping for the uplink data to which the header is added on the basis of the identification information corresponding to the quality of service. Specifically, for example, the gateway 200 (the control unit 235) transmits uplink data having a higher quality of service preferentially (earlier than the others) by queueing (for example, WRR, WFQ or the like) or traffic shaping.

The priority control may include determination of a DSCP value in an IP header added to the uplink data to which the header is added. That is, the gateway 200 (the control unit 235) may determine the DSCP value on the basis of the identification information corresponding to the quality of service. Specifically, for example, a mapping between a quality of service (for example, a QCI or an IP flow) and a DSCP value may be predefined and the gateway 200 (the control unit 235) may determine a DSCP value such that the DSCP value in the IP header corresponds to the quality of service for the uplink data.

As described above, for example, priority control is performed on the basis of the identification information. This enables, for example, the gateway 200 to indeed preferentially transmit uplink data having higher quality of service. As a result, quality of service is satisfied and stable services can be provided.

(2-4) Others

For example, the base station 100 (the second communication processing unit 143) transmits information indicative of the quality of service corresponding to the identification information to the gateway 200 and the gateway 200 (the second communication processing unit 233) receives the information. As an example, the information includes the identification information (for example, a TEID of GTP-u or a key of GRE) and information indicative of the quality of service (a QCI or an IP flow). This, for example, enables the gateway 200 to identify the quality of service from the identification information.

(2-5) Process Flow

FIG. 12 is a flow chart for describing an example of a schematic flow of a process in the gateway 200 according to the first example embodiment.

The gateway 200 (the first communication processing unit 231) adds a header of a framing protocol to uplink data transmitted by the terminal apparatus 400 through WLAN (S711).

The gateway 200 (the control unit 235) performs priority control on transmission of the uplink data to which the header is added on the basis of the identification information corresponding to the quality of service (S713).

The gateway 200 (the second communication processing unit 233) transmit the uplink data to which the header is added to the base station 100 (S715).

The first example embodiment has been described as above. Note that the base station 100 (the control unit 245) or the gateway 200 (the control unit 235) may also perform bearer control on the basis of the quality of service (or the identification information). Specifically, the bearer control may include configuration, reconfiguration or disconnection of a bearer. One of the base station 100 (the control unit 145) and the gateway 200 (the control unit 235) may provide the other with instructions for the bearer control. In addition, the base station 100 (the control unit 145) may provide the gateway 200 with instructions for configuration, reconfiguration or disconnection of a security tunnel (for example, an IPSec tunnel) between the terminal apparatus 400 and the gateway 200 on the basis of the quality of service (or the identification information).

5. Second Example Embodiment

Figure 13:
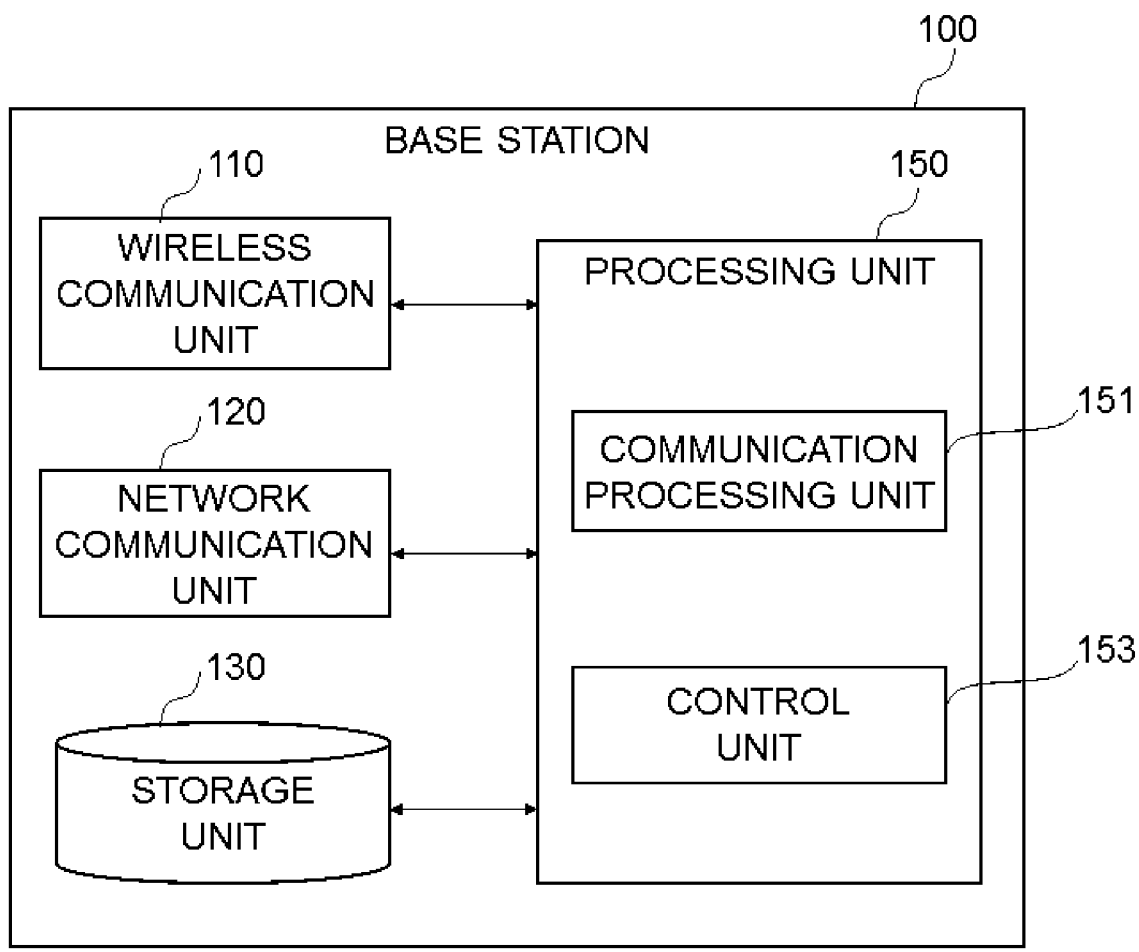
FIG. 13 is a block diagram illustrating an example of a schematic configuration of a base station according to a second example embodiment.
Figure 14:
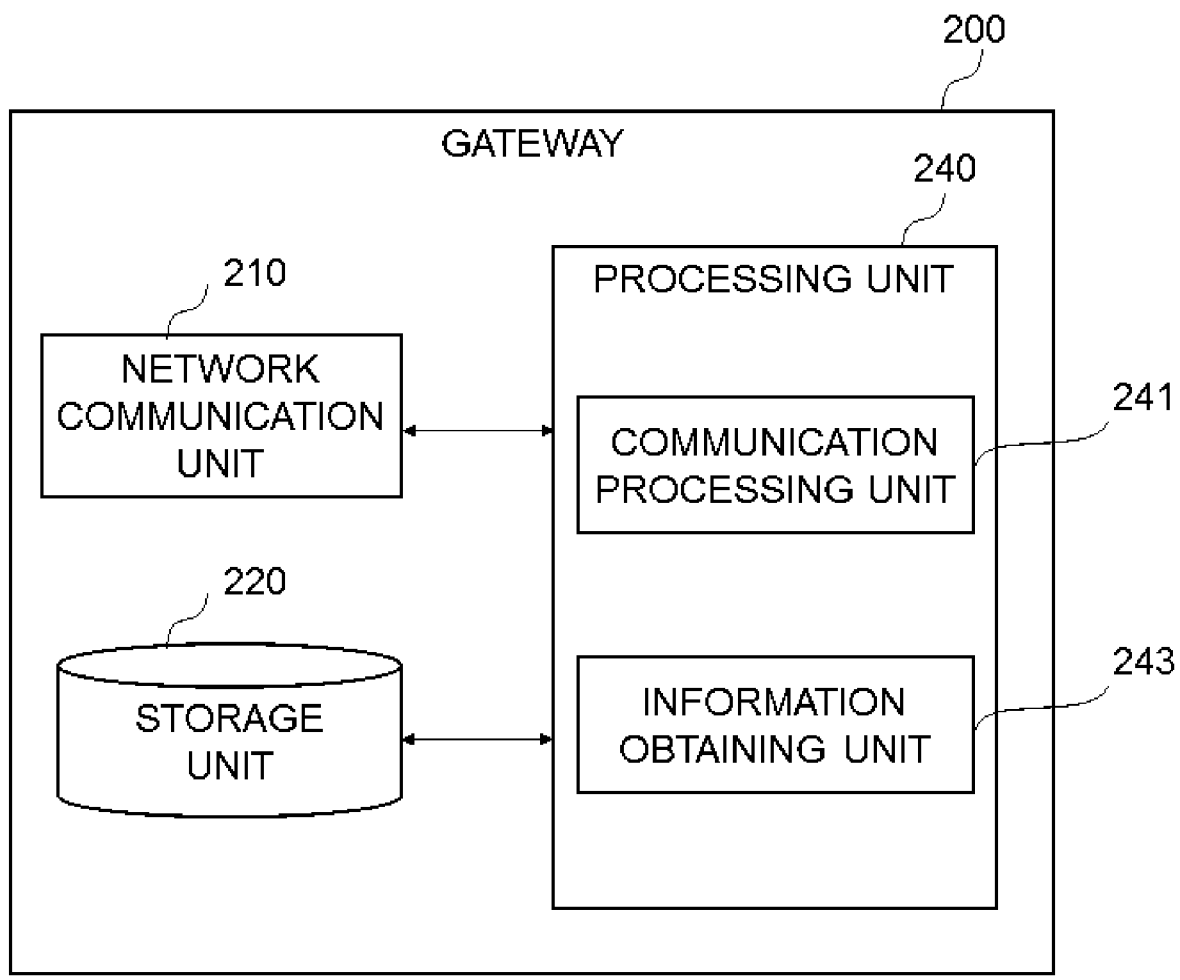
FIG. 14 is a block diagram illustrating an example of a schematic configuration of a gateway according to the second example embodiment.

Next, a second example embodiment of the present invention will be described with reference to FIG. 13 to FIG. 15.

5.1. Configuration of Base Station

First, an example of a configuration of the base station 100 according to the second example embodiment is described with reference to FIG. 13. FIG. 13 is a block diagram illustrating an example of a schematic configuration of the base station 100 according to the second example embodiment. Referring to FIG. 13, the base station 100 includes a wireless communication unit 110, a network communication unit 120, a storage unit 130 and a processing unit 150.

Descriptions about the wireless communication unit 110, the network communication unit 120 and the storage unit 130 are the same as those in the first example embodiment. Hence, duplicate descriptions are herein omitted.

(1) Processing Unit 150

The processing unit 150 is configured to provide various functions of the base station 100. The processing unit 150 includes a communication processing unit 151 and a control unit 153. Note that the processing unit 150 may further include another constituent element than these constituent elements. That is, the processing unit 150 may perform operations other than the operations of these constituent elements. Specific actions of the communication processing unit 151 and the control unit 153 will be described in detail later.

For example, the processing unit 150 communicates with terminal apparatuses (for example, the terminal apparatus 400) via the wireless communication unit 110. For example, the processing unit 150 communicates with other network nodes (for example, the gateway 200, core network nodes or the like) via the network communication unit 120. Specifically, for example, the processing unit 150 (the communication processing unit 151) communicates with the gateway 200 via the network communication unit 120.

As an example, the communication processing unit 151 performs processing of the new protocols in FIG. 6 or FIG. 7 (for example, GRE or GTP-u, and UDP) and IP. In addition, the control unit 153 acts as a controller illustrated in FIG. 6 or FIG. 7.

(2) Implementation Examples

The processing unit 150 may be implemented with a Base Band (BB) processor, another processor and/or the like. The communication processing unit 151 and the control unit 153 may be implemented with the same processor or with respective different processors. A memory (the storage unit 130) may be included in such a processor (a chip).

The base station 100 may include a memory that stores programs and one or more processors that are capable of executing the programs and the one or more processors may execute the operations of the processing unit 150 (operations of the communication processing unit 151 and the control unit 153). The programs may be programs for causing the one or more processors to execute the operations of the processing unit 150 (operations of the communication processing unit 151 and the control unit 153).

5.2. Configuration of Gateway

Next, an example of a configuration of the gateway 200 according to the second example embodiment is described with reference to FIG. 14. FIG. 14 is a block diagram illustrating an example of a schematic configuration of the gateway 200 according to the second example embodiment. Referring to FIG. 14, the gateway 200 includes a network communication unit 210, a storage unit 220 and a processing unit 240.

Descriptions about the network communication unit 210 and the storage unit 220 are the same as those in the first example embodiment. Hence, duplicate descriptions are herein omitted.

(1) Processing Unit 240

The processing unit 240 is configured to provide various functions of the gateway 200. The processing unit 240 includes a communication processing unit 241 and an information obtaining unit 243. Note that the processing unit 240 may further include another constituent element than these constituent elements. That is, the processing unit 240 may perform operations other than the operations of these constituent elements. Specific actions of the communication processing unit 241 and the information obtaining unit 243 will be described in detail later.

For example, the processing unit 240 (the communication processing unit 241) communicates with other nodes (for example, the base station 100, the terminal apparatus 400 or core network nodes) via the network communication unit 210. Specifically, for example, the processing unit 240 (the communication processing unit 241) communicates with the base station 100 (or core network nodes) via the network communication unit 210. In addition, for example, the processing unit 240 (the communication processing unit 241) communicate with the terminal apparatus 400 via the network communication unit 210 through WLAN (the WLAN-AP 300).

As an example, the communication processing unit 241 performs processing of the protocols within the gateway 200 illustrated in FIG. 6, FIG. 7 or FIG. 8. In addition, the information obtaining unit 243 acts as a controller illustrated in FIG. 6, FIG. 7 or FIG. 8.

(2) Implementation Examples

The processing unit 240 may be implemented with a processor or the like. The communication processing unit 241 and the information obtaining unit 243 may be implemented with the same processor or with respective different processors. A memory (the storage unit 220) may be included in such a processor (a chip).

The gateway 200 may include a memory that stores programs and one or more processors that are capable of executing the programs and the one or more processors may execute the operations of the processing unit 240 (operations of the communication processing unit 241 and the information obtaining unit 243). The programs may be programs for causing the one or more processors to execute the operations of the processing unit 240 (operations of the communication processing unit 241 and the information obtaining unit 243).

5.3. Technical Features

Figure 15:
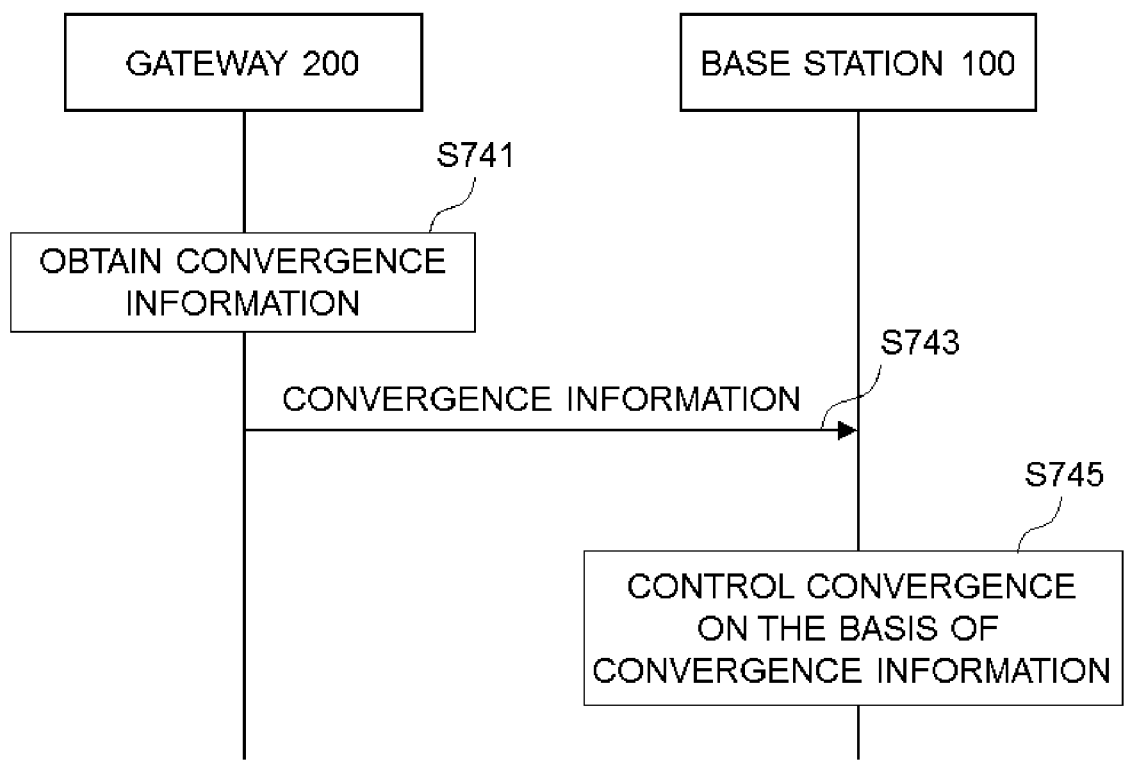
FIG. 15 is a sequence diagram for describing an example of a schematic flow of a process according to the second example embodiment.

Next, with reference to FIG. 15, technical features of the second example embodiment are described.

The gateway 200 (the communication processing unit 241) transmits downlink data from the base station 100 to the terminal apparatus 400 through WLAN and/or receives uplink data from the terminal apparatus 400 through the WLAN.

Among others, the gateway 200 (the information obtaining unit 243) obtains convergence information about convergence at the gateway 200 or the WLAN. Then, the gateway 200 (the communication processing unit 241) transmits the convergence information to the base station 100. The base station 100 (the communication processing unit 151) receives the convergence information from the gateway 200.

This, for example, enables the base station 100 to become aware of convergence at the gateway 200 or the WLAN. Thus, the base station 100 can avoid a data loss in downlink due to offloading by suppressing or stopping transmission of downlink data (offloading) through the WLAN.

Note that the convergence at the WLAN may mean convergence at one or more WLAN-APs 300.

(1) Convergence Information

As an example, the convergence information is information indicative of presence or absence of convergence at the gateway 200 or the WLAN (a convergence flag).

As another example, the convergence information may be information indicative of degree of convergence at the gateway 200 or the WLAN. Specifically, for example, multiple degrees are defined and the convergence information may be information indicative of one of the degrees.

As yet another example, the convergence information may be information for determining presence or absence of degree of convergence at the gateway 200 or the WLAN. As an example, the convergence information may be information indicative of CPU utilization at the gateway 200 or the WLAN-AP 300, presence or absence of convergence of data reception buffer and/or presence or absence of back-pressure.

(2) Obtaining of Convergence Information

For example, the convergence information is information about convergence at the gateway 200. In this case, for example, the gateway 200 (the processing unit 240) performs measurement on convergence at the gateway 200 and generates the convergence information on the basis of the measurement result. Then, the gateway 200 (the information obtaining unit 243) obtains the generated convergence information.

The convergence information may be information about convergence at the WLAN (one or more WLAN-APs 300). In this case, for example, the gateway 200 (the processing unit 240) may collect Simple Network Management Protocol (SNMP) information from one or more WLAN-APs 300 and generate the convergence information on the basis of the SNMP information. Then, the gateway 200 (the information obtaining unit 243) obtains the generated convergence information. Note that the convergence information may be the SNMP information itself and, in this case, the gateway 200 (the information obtaining unit 243) obtains the collected SNMP information.

(3) Transmission of Convergence Information

For example, the gateway 200 (the communication processing unit 241) receives uplink data from the terminal apparatus 400 through the WLAN, add a header of a framing protocol to the uplink data and transmits the uplink data to which the header is added to the base station 100. The header includes the convergence information.

For example, the convergence information is a convergence flag (within the header) indicative of presence or absence of convergence at the gateway 200 or the WLAN.

For example, the framing protocol is GTP-u or GRE. That is, the gateway 200 (the communication processing unit 241) transmits, to the base station 100, uplink data to which a GTP-u header or a GRE header is added including the convergence information (for example, a convergence flag). For example, the convergence information is included in an unused area of the GTP-u header or the GRE header.

This, for example, makes it possible to transmit convergence information without transmitting any additional information. As such, overhead can be suppressed. Moreover, there is no need to define a new protocol, allowing for easier introduction.

Note that the way to transmit the convergence information is not limited to the above-described examples. For example, the gateway 200 (the communication processing unit 241) may transmit, to the base station 100, a control-plane message including the convergence information.

The gateway 200 (the communication processing unit 241), for example, transmits the convergence information to the base station 100 when a trigger condition is satisfied, or periodically. The trigger condition may be, for example, that an amount of uplink data packets in a buffer of the gateway 200 exceeds a preset threshold, that a channel is busy, or the like.

(4) Convergence Control

For example, the base station 100 (the control unit 153) controls the convergence on the basis of the convergence information.

For example, the base station 100 (the communication processing unit 151) transmits, to the gateway 200, downlink data to be transmitted to the terminal apparatus 400 through the WLAN, and the control includes suppressing or stopping transmission of downlink data through the gateway 200 and the WLAN. That is, the base station 100 suppresses or stops transmission of downlink data (offloading) through the gateway 200 and the WLAN on the basis of the convergence information. Specifically, for example, the base station 100 suppresses or stops offloading upon detecting the convergence from the convergence information.

This, for example, makes it possible to avoid a data loss in downlink due to offloading.

(5) Process Flow

FIG. 15 is a sequence diagram for describing an example of a schematic flow of a process according to the second example embodiment.

The gateway 200 (the information obtaining unit 243) obtains convergence information about convergence at the gateway 200 or the WLAN (S741).

The gateway 200 (the communication processing unit 241) transmits the convergence information to the base station 100, and the base station 100 (the communication processing unit 151) receives the convergence information from the gateway 200 (S743).

The base station 100 (the control unit 153) controls the convergence on the basis of the convergence information (S745).

6. Third Example Embodiment

Figure 16:
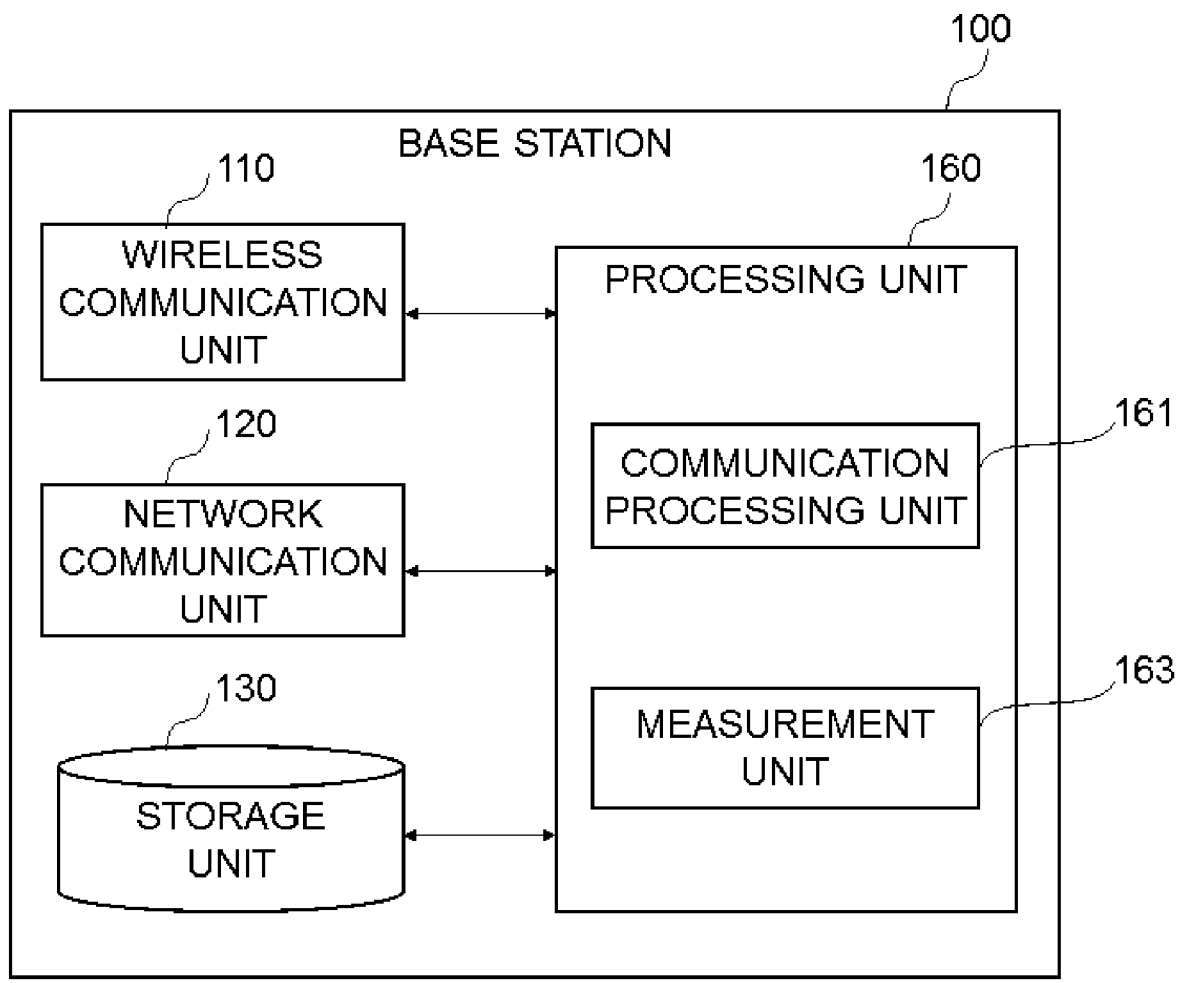
FIG. 16 is a block diagram illustrating an example of a schematic configuration of a base station according to a third example embodiment.
Figure 17:
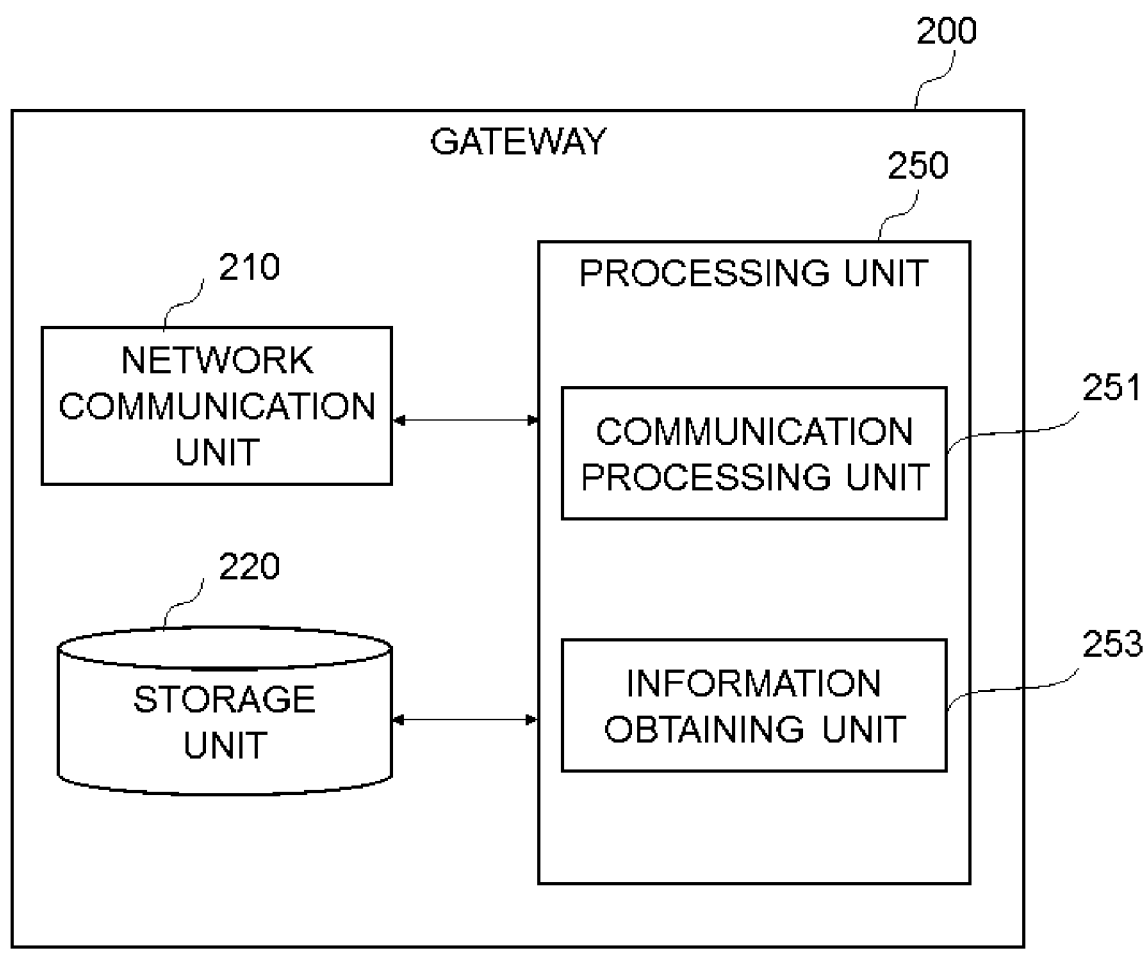
FIG. 17 is a block diagram illustrating an example of a schematic configuration of a gateway according to the third example embodiment.

Next, a third example embodiment of the present invention will be described with reference to FIG. 16 to FIG. 18.

6.1. Configuration of Base Station

First, an example of a configuration of the base station 100 according to the third example embodiment is described with reference to FIG. 16. FIG. 16 is a block diagram illustrating an example of a schematic configuration of the base station 100 according to the third example embodiment. Referring to FIG. 16, the base station 100 includes a wireless communication unit 110, a network communication unit 120, a storage unit 130 and a processing unit 160.

Descriptions about the wireless communication unit 110, the network communication unit 120 and the storage unit 130 are the same as those in the first example embodiment. Hence, duplicate descriptions are herein omitted.

(1) Processing Unit 160

The processing unit 160 is configured to provide various functions of the base station 100. The processing unit 160 includes a communication processing unit 161 and a measurement unit 163. Note that the processing unit 160 may further include another constituent element than these constituent elements. That is, the processing unit 160 may perform operations other than the operations of these constituent elements. Specific actions of the communication processing unit 161 and the measurement unit 163 will be described in detail later.

For example, the processing unit 160 communicates with terminal apparatuses (for example, the terminal apparatus 400) via the wireless communication unit 110. For example, the processing unit 160 communicates with other network nodes (for example, the gateway 200, core network nodes or the like) via the network communication unit 120. Specifically, for example, the processing unit 160 (the communication processing unit 161) communicates with the gateway 200 via the network communication unit 120.

As an example, the communication processing unit 161 performs processing of the new protocols in FIG. 6 or FIG. 7 (for example, GRE or GTP-u, and UDP) and IP. In addition, the measurement unit 163 acts as a controller illustrated in FIG. 6 or FIG. 7.

(2) Implementation Examples

The processing unit 160 may be implemented with a Base Band (BB) processor, another processor and/or the like. The communication processing unit 161 and the measurement unit 163 may be implemented with the same processor or with respective different processors. A memory (the storage unit 130) may be included in such a processor (a chip).

The base station 100 may include a memory that stores programs and one or more processors that are capable of executing the programs and the one or more processors may execute the operations of the processing unit 160 (operations of the communication processing unit 161 and the measurement unit 163). The programs may be programs for causing the one or more processors to execute the operations of the processing unit 160 (operations of the communication processing unit 161 and the measurement unit 163).

6.2. Configuration of Gateway

Next, an example of a configuration of the gateway 200 according to the third example embodiment is described with reference to FIG. 17. FIG. 17 is a block diagram illustrating an example of a schematic configuration of the gateway 200 according to the third example embodiment. Referring to FIG. 17, the gateway 200 includes a network communication unit 210, a storage unit 220 and a processing unit 250.

Descriptions about the network communication unit 210 and the storage unit 220 are the same as those in the first example embodiment. Hence, duplicate descriptions are herein omitted.

(1) Processing Unit 250

The processing unit 250 is configured to provide various functions of the gateway 200. The processing unit 250 includes a communication processing unit 251 and an information obtaining unit 253. Note that the processing unit 250 may further include another constituent element than these constituent elements. That is, the processing unit 250 may perform operations other than the operations of these constituent elements. Specific actions of the communication processing unit 251 and the information obtaining unit 253 will be described in detail later.

For example, the processing unit 250 (the communication processing unit 251) communicates with other nodes (for example, the base station 100, the terminal apparatus 400 or core network nodes) via the network communication unit 210. Specifically, for example, the processing unit 250 (the communication processing unit 251) communicates with the base station 100 (or core network nodes) via the network communication unit 210. In addition, for example, the processing unit 250 (the communication processing unit 251) communicate with the terminal apparatus 400 via the network communication unit 210 through WLAN (the WLAN-AP 300).

As an example, the communication processing unit 251 performs processing of the protocols within the gateway 200 illustrated in FIG. 6, FIG. 7 or FIG. 8. In addition, the information obtaining unit 253 acts as a controller illustrated in FIG. 6, FIG. 7 or FIG. 8.

(2) Implementation Examples

The processing unit 250 may be implemented with a processor or the like. The communication processing unit 251 and the information obtaining unit 253 may be implemented with the same processor or with respective different processors. A memory (the storage unit 220) may be included in such a processor (a chip).

The gateway 200 may include a memory that stores programs and one or more processors that are capable of executing the programs and the one or more processors may execute the operations of the processing unit 250 (operations of the communication processing unit 251 and the information obtaining unit 253). The programs may be programs for causing the one or more processors to execute the operations of the processing unit 250 (operations of the communication processing unit 251 and the information obtaining unit 253).

6.3. Technical Features

Figure 18:
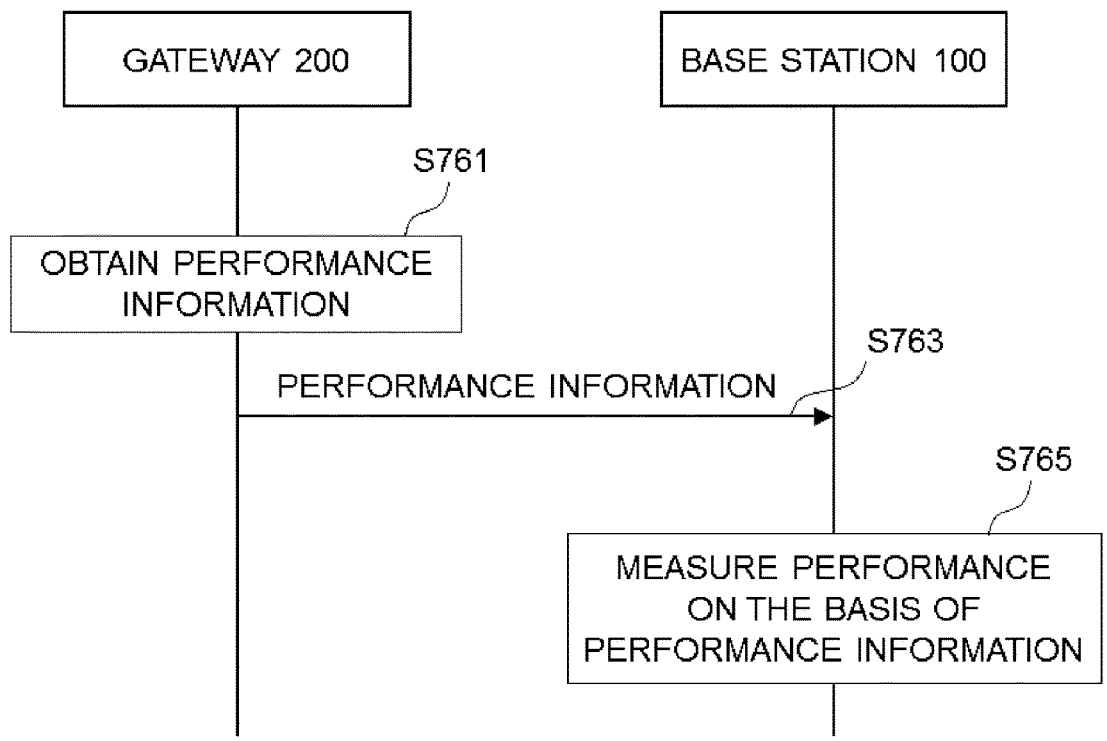
FIG. 18 is a sequence diagram for describing an example of a schematic flow of a process according to the third example embodiment.

Next, with reference to FIG. 18, technical features of the third example embodiment are described.

The gateway 200 (the communication processing unit 251) transmits, to the terminal apparatus 400 through WLAN, downlink data from the base station 100 and/or receives uplink data from the terminal apparatus 400 through the WLAN. That is, the gateway 200 is used for communication between the base station 100 and the terminal apparatus 400 through WLAN.

Among others, the gateway 200 (the information obtaining unit 253) obtains performance information about communication performance at the gateway 200 or the WLAN. Then, the gateway 200 (the communication processing unit 251) transmits the performance information to the base station 100.

The base station 100 (the communication processing unit 161) receives the performance information from the gateway 200. Then, the base station 100 (the measurement unit 163) measures (or monitors) performance related to the gateway 200 or the WLAN on the basis of the performance information.

This, for example, makes it possible to easily know the performance of communication through WLAN and, as a result, appropriate routing decision and/or network design (for example, enlarging or shrinking the LWIP system) may become easier.

Note that the communication performance at the WLAN may mean communication performance at one or more WLAN-APs 300.

(1) Performance Information

For example, the communication performance is communication performance per quality of service basis. For example, the quality of service corresponds to a QCI or an IP flow. This, for example, makes it possible to easily know performance for each quality of service.

As an example, the communication performance includes throughput, utilization or a number of packet losses at the gateway 200 or the WLAN. Of course, the performance information is not limited to these examples. For example, the performance information may be Key Performance Indicators (KPIs).

(2) Obtaining of Performance Information

For example, the performance information is information about communication performance at the gateway 200. In this case, for example, the gateway 200 (the processing unit 250) measures communication performance at the gateway 200 and generates the performance information on the basis of the measurement result. Then, the gateway 200 (the information obtaining unit 253) obtains the generated performance information.

The performance information may be information about communication performance at the WLAN (one or more WLAN-APs 300). In this case, the gateway 200 (the processing unit 250) may collect SNMP information from one or more WLAN-APs 300 and generate the performance information on the basis of the SNMP information. Then, the gateway 200 (the information obtaining unit 253) obtains the generated performance information. Note that the performance information may be the SNMP information itself and, in this case, the gateway 200 (the information obtaining unit 253) obtains the collected SNMP information.

(3) Transmission of Performance Information

For example, the gateway 200 (the communication processing unit 251) receives uplink data from the terminal apparatus 400 through the WLAN, add a header of a framing protocol to the uplink data and transmits the uplink data to which the header is added to the base station 100. The header includes the performance information.

For example, the framing protocol is GTP-u or GRE. That is, the gateway 200 (the communication processing unit 251) transmits, to the base station 100, uplink data to which a GTP-u header or a GRE header is added including the performance information. For example, the performance information is included in an unused area of the GTP-u header or the GRE header.

This, for example, makes it possible to transmit performance information without transmitting any additional information. As such, overhead can be suppressed. Moreover, there is no need to define a new protocol, allowing for easier introduction.

Note that the way to transmit the performance information is not limited to the above-described examples. For example, the gateway 200 (the communication processing unit 251) may transmit, to the base station 100, a control-plane message including the performance information.

The gateway 200 (the communication processing unit 251), for example, transmits the performance information to the base station 100 when a trigger condition is satisfied, or periodically.

(4) Performance Measurement

The performance measurement about the gateway 200 or the WLAN may be defined, for example, in 3GPP TS 32.425 or other 3GPP technical specifications (TSs).

As an example, the performance measurement includes measurement on throughput, utilization or a number of packet losses at the gateway 200 or the WLAN. Of course, the performance measurement is not limited to these examples.

For example, the result of the performance measurement is statistical information of communication performance at the gateway 200 or the WLAN.

(5) Process Flow

FIG. 18 is a sequence diagram for describing an example of a schematic flow of a process according to the third example embodiment.

The gateway 200 (the information obtaining unit 253) obtains performance information about communication performance at the gateway 200 or the WLAN (S761).

The gateway 200 (the communication processing unit 251) transmits the performance information to the base station 100, and the base station 100 (the communication processing unit 161) receives the performance information from the gateway 200 (S763).

The base station 100 (the control unit 153) measures performance about the gateway 200 or the WLAN on the basis of the performance information (S765).

7. Fourth Example Embodiment

Figure 19:
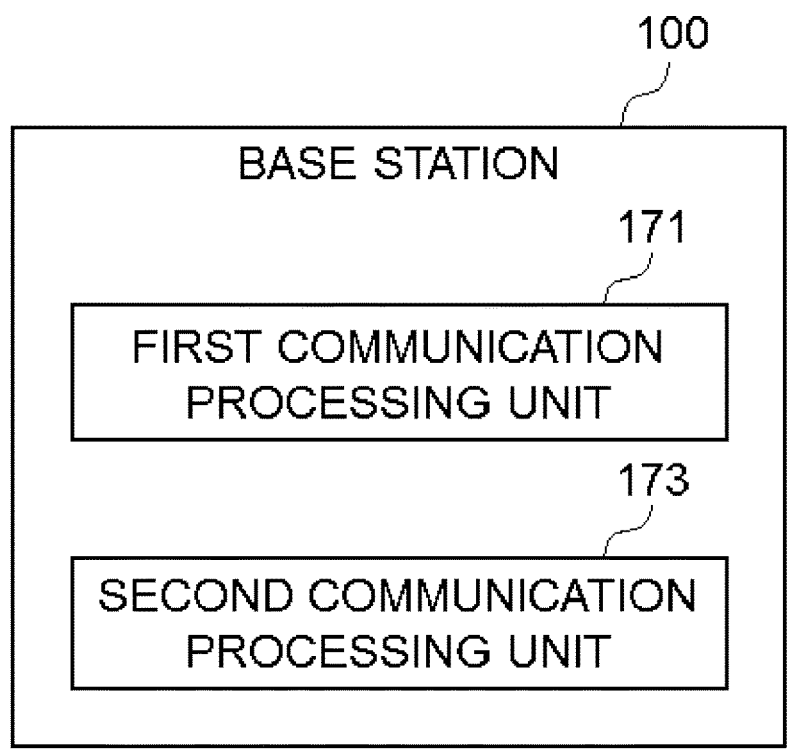
FIG. 19 is a block diagram illustrating an example of a schematic configuration of a base station according to a fourth example embodiment.
Figure 20:
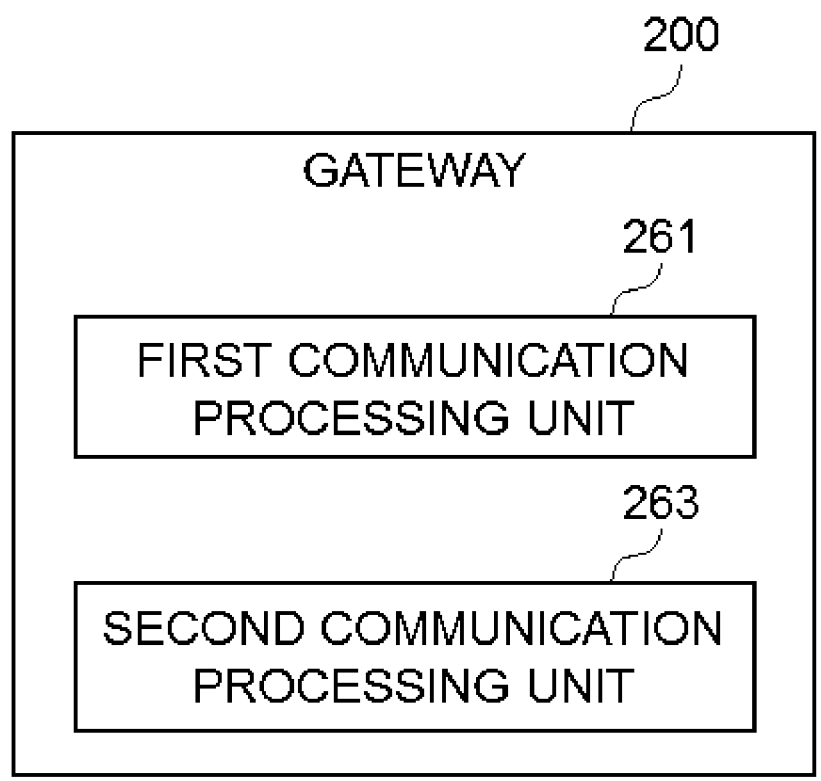
FIG. 20 is a block diagram illustrating an example of a schematic configuration of a gateway according to the fourth example embodiment.

Next, a fourth example embodiment of the present invention will be described with reference to FIG. 19 and FIG. 20. The foregoing first example embodiment is a concrete example embodiment whereas the fourth example embodiment is a more generalized example embodiment.

7.1. Configuration of Base Station

First, an example of a configuration of the base station 100 according to the fourth example embodiment is described with reference to FIG. 19. FIG. 19 is a block diagram illustrating an example of a schematic configuration of the base station 100 according to the fourth example embodiment. Referring to FIG. 19, the base station 100 includes a first communication processing unit 171 and a second communication processing unit 173.

Specific actions of the first communication processing unit 171 and the second communication processing unit 173 will be described later.

The first communication processing unit 171 and the second communication processing unit 173 may be implemented with a Base Band (BB) processor, another processor and/or the like. The first communication processing unit 171 and the second communication processing unit 173 may be implemented with the same processor or with respective different processors.

The base station 100 may include a memory that stores programs and one or more processors that are capable of executing the programs and the one or more processors may execute the operations of the first communication processing unit 171 and the second communication processing unit 173. The programs may be programs for causing the one or more processors to execute the operations of the first communication processing unit 171 and the second communication processing unit 173.

7.2. Configuration of Gateway

First, an example of a configuration of the gateway 200 according to the fourth example embodiment is described with reference to FIG. 20. FIG. 20 is a block diagram illustrating an example of a schematic configuration of the gateway 200 according to the fourth example embodiment. Referring to FIG. 20, the gateway 200 includes the first communication processing unit 261 and the second communication processing unit 263.

Specific actions of the first communication processing unit 261 and the second communication processing unit 263 will be described later.

The first communication processing unit 261 and the second communication processing unit 263 may be implemented with a processor and/or the like. The first communication processing unit 261 and the second communication processing unit 263 may be implemented with the same processor or with respective different processors.

The gateway 200 may include a memory that stores programs and one or more processors that are capable of executing the programs and the one or more processors may execute the operations of the first communication processing unit 261 and the second communication processing unit 263. The programs may be programs for causing the one or more processors to execute the operations of the first communication processing unit 261 and the second communication processing unit 263.

7.3. Technical Features

Next, technical features of the fourth example embodiment are described.

(1) Technical Features Related to Downlink

The base station 100 (the first communication processing unit 171) adds a header of a framing protocol to downlink data transmitted to the terminal apparatus 400. Then, the base station 100 (the second communication processing unit 173) transmits the downlink data to which the header is added to the gateway 200. Note that the gateway 200 is used for transmission from the base station 100 to the terminal apparatus 400 through WLAN.

The framing protocol is a protocol for communication between the base station 100 and the gateway 200. The header includes identification information corresponding to quality of service for the downlink data.

This, for example, leads to a tunnel per quality of service and enables the base station 100 to preferentially transmit downlink data having higher quality of service. As a result, quality of service is satisfied and stable services can be provided.

Descriptions about the framing protocol, the header and the identification information, priority control and/or process flow can be done, for example, similarly to the descriptions thereof in the first example embodiment except for the differences in some reference signs. Hence, duplicate descriptions are herein omitted.

(2) Technical Features Related to Uplink

The gateway 200 (the first communication processing unit 261) adds a header of a framing protocol to uplink data transmitted by the terminal apparatus 400 through WLAN. Then, the gateway 200 (the second communication processing unit 263) transmits the uplink data to which the header is added to the base station 100.

The framing protocol is a protocol for communication between the gateway 200 and the base station 100. The header includes identification information corresponding to quality of service for the uplink data.

This, for example, leads to a tunnel per quality of service and enables the gateway 200 to preferentially transmit uplink data having higher quality of service. As a result, quality of service is satisfied and stable services can be provided.

Descriptions about the framing protocol, the header and the identification information, priority control, others and/or process flow can be done, for example, similarly to the descriptions thereof in the first example embodiment. Hence, duplicate descriptions are herein omitted.

8. Fifth Example Embodiment

Figure 21:
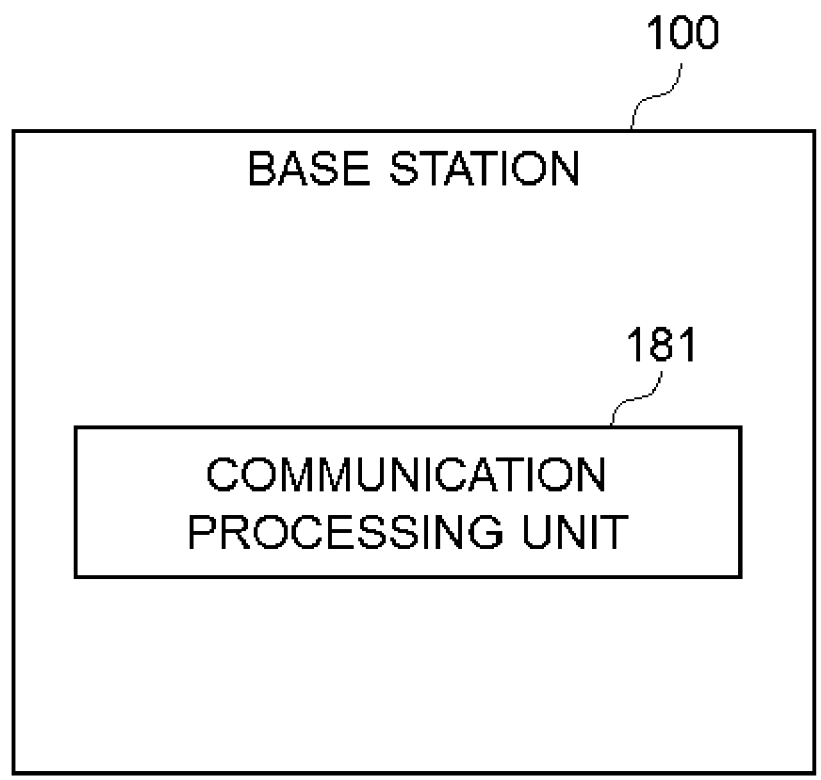
FIG. 21 is a block diagram illustrating an example of a schematic configuration of a base station according to a fifth example embodiment.
Figure 22:
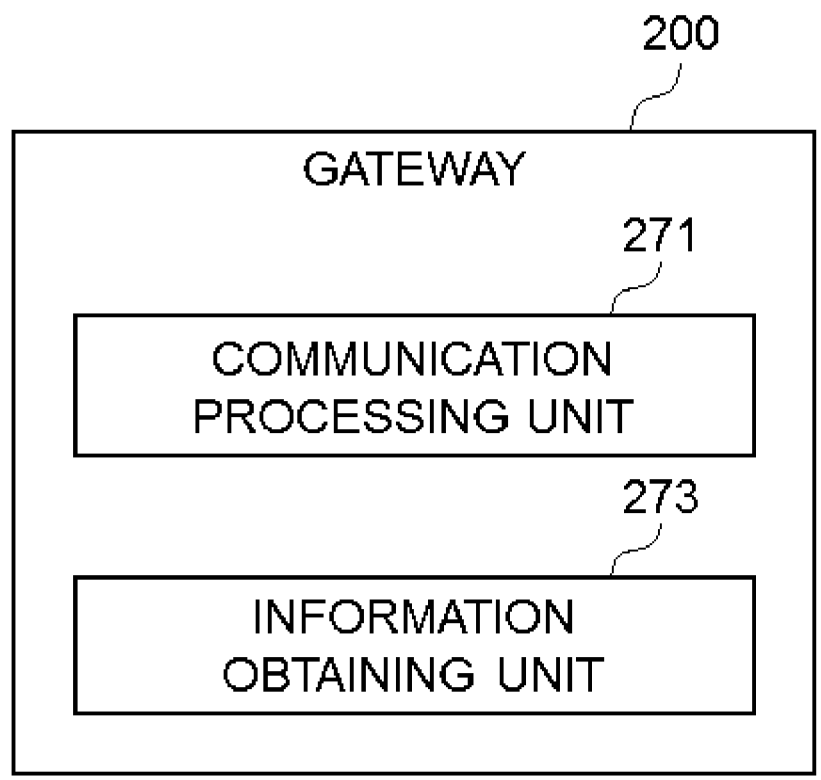
FIG. 22 is a block diagram illustrating an example of a schematic configuration of a gateway according to the fifth example embodiment.

Next, a fifth example embodiment of the present invention will be described with reference to FIG. 21 and FIG. 22. The foregoing second example embodiment is a concrete example embodiment whereas the fifth example embodiment is a more generalized example embodiment.

8.1. Configuration of Base Station

First, an example of a configuration of the base station 100 according to the fifth example embodiment is described with reference to FIG. 21. FIG. 21 is a block diagram illustrating an example of a schematic configuration of the base station 100 according to the fifth example embodiment. Referring to FIG. 21, the base station 100 includes a communication processing unit 181.

Specific actions of the communication processing unit 181 will be described later.

The communication processing unit 181 may be implemented with a Base Band (BB) processor, another processor and/or the like.

The base station 100 may include a memory that stores programs and one or more processors that are capable of executing the programs and the one or more processors may execute the operations of the communication processing unit 181. The programs may be programs for causing the one or more processors to execute the operations of the communication processing unit 181.

8.2. Configuration of Gateway

First, an example of a configuration of the gateway 200 according to the fifth example embodiment is described with reference to FIG. 22. FIG. 22 is a block diagram illustrating an example of a schematic configuration of the gateway 200 according to the fifth example embodiment. Referring to FIG. 22, the gateway 200 includes a communication processing unit 271 and an information obtaining unit 273.

Specific actions of the communication processing unit 271 and the information obtaining unit 273 will be described later.

The communication processing unit 271 and the information obtaining unit 273 may be implemented with a processor and/or the like. The communication processing unit 271 and the information obtaining unit 273 may be implemented with the same processor or with respective different processors.

The gateway 200 may include a memory that stores programs and one or more processors that are capable of executing the programs and the one or more processors may execute the operations of the communication processing unit 271 and the information obtaining unit 273. The programs may be programs for causing the one or more processors to execute the operations of the communication processing unit 271 and the information obtaining unit 273.

8.3. Technical Features

Next, technical features of the fifth example embodiment are described.

The gateway 200 (the communication processing unit 271) transmits downlink data from the base station 100 to the terminal apparatus 400 through WLAN and/or receives uplink data from the terminal apparatus 400 through the WLAN.

Among others, the gateway 200 (the information obtaining unit 273) obtains convergence information about convergence at the gateway 200 or the WLAN. Then, the gateway 200 (the communication processing unit 271) transmits the convergence information to the base station 100.

The base station 100 (the communication processing unit 181) receives the convergence information from the gateway 200.

This, for example, enables the base station 100 to become aware of convergence at the gateway 200 or the WLAN. Thus, the base station 100 can avoid a data loss in downlink due to offloading by suppressing or stopping transmission of downlink data (offloading) through the WLAN.

Note that the convergence at the WLAN may mean convergence at one or more WLAN-APs 300.

Descriptions about the convergence information, obtaining of convergence information, transmission of convergence information, convergence control and/or process flow can be done, for example, similarly to the descriptions thereof in the second example embodiment except for the differences in some reference signs. Hence, duplicate descriptions are herein omitted.

9. Sixth Example Embodiment

Figure 23:
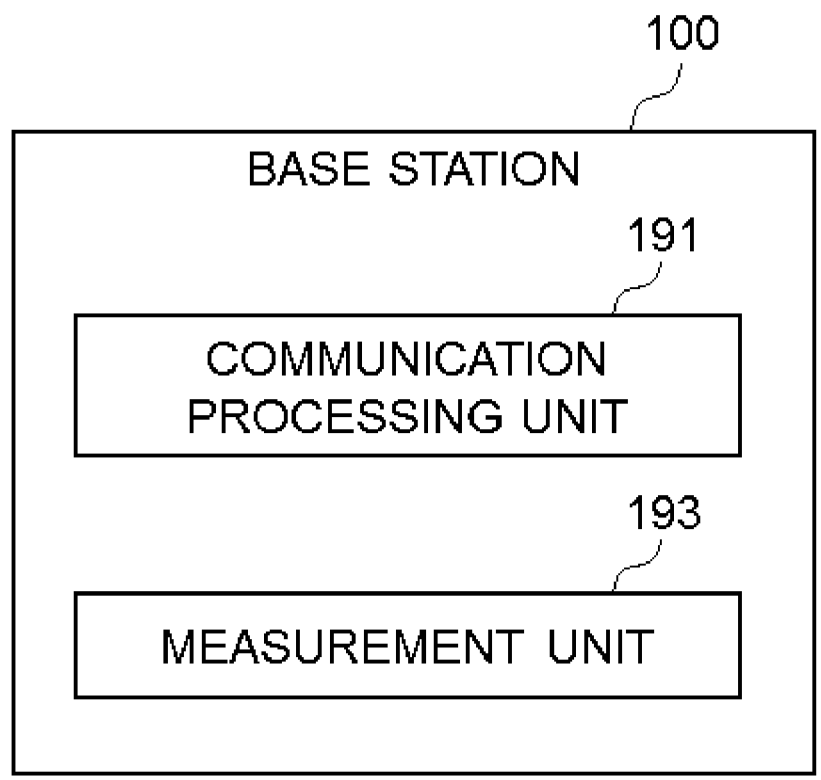
FIG. 23 is a block diagram illustrating an example of a schematic configuration of a base station according to a sixth example embodiment.
Figure 24:
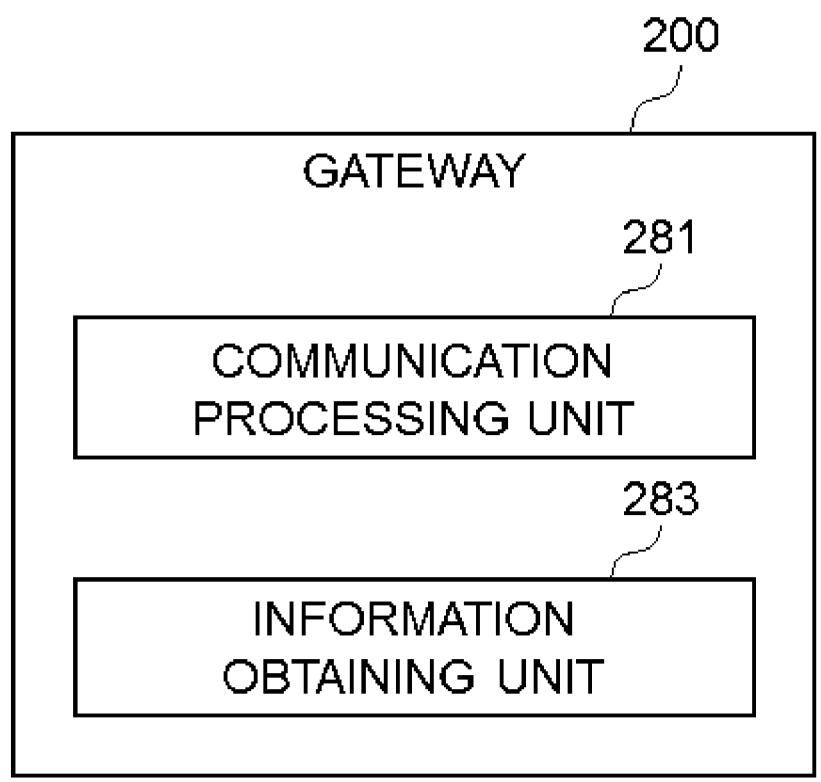
FIG. 24 is a block diagram illustrating an example of a schematic configuration of a gateway according to the sixth example embodiment.

Next, a sixth example embodiment of the present invention will be described with reference to FIG. 23 and FIG. 24. The foregoing third example embodiment is a concrete example embodiment whereas the sixth example embodiment is a more generalized example embodiment.

9.1. Configuration of Base Station

First, an example of a configuration of the base station 100 according to the sixth example embodiment is described with reference to FIG. 23. FIG. 23 is a block diagram illustrating an example of a schematic configuration of the base station 100 according to the sixth example embodiment. Referring to FIG. 23, the base station 100 includes a communication processing unit 191 and a measurement unit 193.

Specific actions of the communication processing unit 191 and the measurement unit 193 will be described later.

The communication processing unit 191 and the measurement unit 193 may be implemented with a Base Band (BB) processor, another processor and/or the like. The communication processing unit 191 and the measurement unit 193 may be implemented with the same processor or with respective different processors.

The base station 100 may include a memory that stores programs and one or more processors that are capable of executing the programs and the one or more processors may execute the operations of the communication processing unit 191 and the measurement unit 193. The programs may be programs for causing the one or more processors to execute the operations of the communication processing unit 191 and the measurement unit 193.

9.2. Configuration of Gateway

First, an example of a configuration of the gateway 200 according to the sixth example embodiment is described with reference to FIG. 24. FIG. 24 is a block diagram illustrating an example of a schematic configuration of the gateway 200 according to the sixth example embodiment. Referring to FIG. 24, the gateway 200 includes a communication processing unit 281 and an information obtaining unit 283.

Specific actions of the communication processing unit 281 and the information obtaining unit 283 will be described later.

The communication processing unit 281 and the information obtaining unit 283 may be implemented with a processor and/or the like. The communication processing unit 281 and the information obtaining unit 283 may be implemented with the same processor or with respective different processors.

The gateway 200 may include a memory that stores programs and one or more processors that are capable of executing the programs and the one or more processors may execute the operations of the communication processing unit 281 and the information obtaining unit 283. The programs may be programs for causing the one or more processors to execute the operations of the communication processing unit 281 and the information obtaining unit 283.

9.3. Technical Features

Next, technical features of the sixth example embodiment are described.

The gateway 200 (the communication processing unit 281) transmits downlink data from the base station 100 to the terminal apparatus 400 through WLAN and/or receives uplink data from the terminal apparatus 400 through the WLAN. That is, the gateway 200 is used for communication between the base station 100 and the terminal apparatus 400 through WLAN.

Among others, the gateway 200 (the information obtaining unit 283) obtains performance information about communication performance at the gateway 200 or the WLAN. Then, the gateway 200 (the communication processing unit 281) transmits the performance information to the base station 100.

The base station 100 (the communication processing unit 191) receives the performance information from the gateway 200. Then, the base station 100 (the measurement unit 193) measures performance related to the gateway 200 or the WLAN on the basis of the performance information.

This, for example, makes it possible to easily know the performance of communication through WLAN and, as a result, appropriate routing decision and/or network design (for example, enlarging or shrinking the LWIP system) may become easier.

Note that the communication performance at the WLAN may mean communication performance at one or more WLAN-APs 300.

Descriptions about the performance information, obtaining of performance information, transmission of performance information, performance measurement and/or process flow can be done, for example, similarly to the descriptions thereof in the third example embodiment except for the differences in some reference signs. Hence, duplicate descriptions are herein omitted.

Though example embodiments of the present invention have been described herein, the present invention is not limited to these example embodiments. It will be understood by those of ordinary skill in the art that these example embodiments are illustrative only and that various alterations can be done without departing from the scope and spirit of the present invention.

For example, the steps in processes described in the present specification may not necessarily be performed chronologically in the order illustrated in the flowcharts or the sequence diagrams. For example, steps in a process may be performed in a different order than the order illustrated in a flowchart or sequence diagram or may be performed in parallel.

Moreover, an apparatus (for example, one or more apparatuses (or units) out of a plurality of apparatuses (or units) comprised in a base station) or a module (for example, a module for one of the plurality of apparatuses (or units)) including constituent elements of the base station described in the present specification (for example, the first communication processing unit, the second communication processing unit, the control unit, the communication processing unit and/or measurement unit) may be provided. A module including constituent elements of the gateway described in the present specification (for example, the first communication processing unit, the second communication processing unit, the control unit, the communication processing unit and/or information obtaining unit) may be provided. In addition, methods including processes of such constituent elements may be provided, and programs for causing processors to execute processes of such constituent elements may be provided. Furthermore, computer-readable non-transitory recording media having recorded thereon such programs may be provided. It is apparent that such apparatuses, modules, methods, programs and computer-readable non-transitory recording media are also included in the present invention.

Some or all of the above-described example embodiments can be described as in the following Supplementary Notes, but are not limited to the following.

Supplementary Note 1

A base station comprising:
a first communication processing unit configured to add a header of a framing protocol to downlink data transmitted to a terminal apparatus; and
a second communication processing unit configured to transmit the downlink data to which the header is added to a gateway that is used for transmission from the base station to the terminal apparatus through a wireless local area network,
wherein the framing protocol is a protocol for communication between the base station and the gateway, and
the header includes identification information corresponding to quality of service for the downlink data.

Supplementary Note 2

The base station according to Supplementary Note 1, wherein the quality of service corresponds to a Quality Class Indicator (QCI) or an Internet Protocol (IP) flow for the downlink data.

Supplementary Note 3

The base station according to Supplementary Note 1 or 2, wherein the identification information is identification information for identifying a bearer for the downlink data.

Supplementary Note 4

The base station according to any one of Supplementary Notes 1 to 3, wherein the framing protocol is a tunneling protocol.

Supplementary Note 5

The base station according to Supplementary Note 4, wherein the framing protocol is GPRS Tunneling Protocol user plane (GTP-u) or Generic Routing Encapsulation (GRE).

Supplementary Note 6

The base station according to Supplementary Note 5, wherein the identification information is Tunnel Endpoint Identifier (TEID) of GTP-u or a key of GRE.

Supplementary Note 7

The base station according to any one of Supplementary Notes 1 to 6, further comprising a control unit configured to perform priority control on transmission of the downlink data to which the header is added on the basis of the identification information.

Supplementary Note 8

The base station according to Supplementary Note 7, wherein the priority control includes:
queueing or traffic shaping for the downlink data to which the header is added;
determination of a Differentiated Service Code Point (DSCP) value in an Internet Protocol (IP) header added to the downlink data to which the header is added; or
selection of the gateway out of a plurality of gateways.

Supplementary Note 9

The base station according to any one of Supplementary Notes 1 to 8, wherein
the base station is an evolved Node B (eNB), and
the terminal apparatus is a User Equipment (UE).

Supplementary Note 10

The base station according to any one of Supplementary Notes 1 to 9, wherein the gateway is a security gateway.

Supplementary Note 11

The base station according to Supplementary Note 10, wherein the gateway is an LTE WLAN RAN Level Integration using IPSec Security Gateway (LWIP-SeGW).

Supplementary Note 12

A gateway comprising:
a first communication processing unit configured to add a header of a framing protocol to uplink data transmitted by a terminal apparatus through a wireless local area network; and
a second communication processing unit configured to transmit the uplink data to which the header is added to a base station,
wherein the framing protocol is a protocol for communication between the gateway and the base station, and
the header includes identification information corresponding to quality of service for the uplink data.

Supplementary Note 13

The gateway according to Supplementary Note 12, wherein the identification information is identification information for identifying a bearer for the uplink data.

Supplementary Note 14

The gateway according to Supplementary Note 12 or 13, further comprising a control unit configured to perform priority control on transmission of the uplink data to which the header is added on the basis of the identification information.

Supplementary Note 15

The gateway according to Supplementary Note 14, wherein the priority control includes:
queueing or traffic shaping for the uplink data to which the header is added; or
determination of a DSCP value in an IP header added to the uplink data to which the header is added.

Supplementary Note 16

The gateway according to any one of Supplementary Notes 12 to 15, wherein the identification information is information included in the uplink data or information transmitted by the terminal apparatus along with the uplink data.

Supplementary Note 17

The gateway according to any one of Supplementary Notes 12 to 16, wherein the second communication processing unit is configured to receive information indicative of the quality of service corresponding to the identification information from the base station.

Supplementary Note 18

A gateway comprising:
a communication processing unit configured to transmit, to a terminal apparatus through a wireless local area network, downlink data from a base station or receive uplink data from a terminal apparatus through the wireless local area network; and
an information obtaining unit configured to obtain convergence information about convergence at the gateway or the wireless local area network,
wherein the communication processing unit is configured to transmit the convergence information to the base station.

Supplementary Note 19

The gateway according to Supplementary Note 18, wherein
the communication processing unit is configured to receive the uplink data, add a header of a framing protocol to the uplink data and transmit, to the base station, the uplink data to which the header is added, and
the header includes the convergence information.

Supplementary Note 20

The gateway according to Supplementary Note 19, wherein the convergence information is a convergence flag indicative of presence or absence of the convergence.

Supplementary Note 21

The gateway according to Supplementary Note 19 or 20, wherein the framing protocol is GTP-u or GRE.

Supplementary Note 22

A base station comprising:
a communication processing unit configured to receive, from a gateway that is used for communication between the base station and a terminal apparatus through a wireless local area network, convergence information about convergence at the gateway or the wireless local area network.

Supplementary Note 23

The base station according to Supplementary Note 22, further comprising a control unit configured to control the convergence on the basis of the convergence information.

Supplementary Note 24

The base station according to Supplementary Note 23, wherein
the communication processing unit is configured to transmit, to the gateway, downlink data to be transmitted to a terminal apparatus through the wireless local area network, and
the control includes suppressing or stopping transmission of downlink data through the gateway and the wireless local area network.

Supplementary Note 25

A base station comprising:
a communication processing unit configured to receive, from a gateway that is used for communication between the base station and a terminal apparatus through a wireless local area network, performance information about communication performance at the gateway or the wireless local area network; and
a measurement unit configured to measure performance related to the gateway or the wireless local area network on the basis of the performance information.

Supplementary Note 26

The base station according to Supplementary Note 25, wherein the performance measurement includes measurement of throughput, utilization or a number of packet losses at the gateway or the wireless local area network.

Supplementary Note 27

The base station according to Supplementary Note 25 or 26, wherein the communication performance is communication performance per quality of service basis.

Supplementary Note 28

The base station according to Supplementary Note 27, wherein the quality of service corresponds to a QCI or an IP flow.

Supplementary Note 29

A gateway comprising:
a communication processing unit configured to transmit, to a terminal apparatus through a wireless local area network, downlink data from a base station or receive uplink data from a terminal apparatus through the wireless local area network; and
an information obtaining unit configured to obtain performance information about communication performance at the gateway or the wireless local area network,
wherein the communication processing unit is configured to transmit the performance information to the base station.

Supplementary Note 30

The gateway according to Supplementary Note 29, wherein
the communication processing unit is configured to receive the uplink data, add a header of a framing protocol to the uplink data and transmit, to the base station, the uplink data to which the header is added, and
the header includes the performance information.

Supplementary Note 31

The gateway according to Supplementary Note 30, wherein the framing protocol is GTP-u or GRE.

Supplementary Note 32

A method comprising:
adding a header of a framing protocol to downlink data transmitted to a terminal apparatus; and
transmitting the downlink data to which the header is added to a gateway that is used for transmission from a base station to the terminal apparatus through a wireless local area network,
wherein the framing protocol is a protocol for communication between the base station and the gateway, and
the header includes identification information corresponding to quality of service for the downlink data.

Supplementary Note 33

A program for causing a processor to execute:
adding a header of a framing protocol to downlink data transmitted to a terminal apparatus; and
transmitting the downlink data to which the header is added to a gateway that is used for transmission from a base station to the terminal apparatus through a wireless local area network,
wherein the framing protocol is a protocol for communication between the base station and the gateway, and
the header includes identification information corresponding to quality of service for the downlink data.

Supplementary Note 34

A computer-readable non-transitory recording medium having recorded thereon a program for causing a processor to execute:
adding a header of a framing protocol to downlink data transmitted to a terminal apparatus; and
transmitting the downlink data to which the header is added to a gateway that is used for transmission from a base station to the terminal apparatus through a wireless local area network,
wherein the framing protocol is a protocol for communication between the base station and the gateway, and
the header includes identification information corresponding to quality of service for the downlink data.

Supplementary Note 35

A method comprising:
 adding a header of a framing protocol to uplink data transmitted by a terminal apparatus through a wireless local area network; and
 transmitting the uplink data to which the header is added to a base station,
 wherein the framing protocol is a protocol for communication between a gateway and the base station, and
 the header includes identification information corresponding to quality of service for the uplink data.

Supplementary Note 36

A program for causing a processor to execute:
 adding a header of a framing protocol to uplink data transmitted by a terminal apparatus through a wireless local area network; and
 transmitting the uplink data to which the header is added to a base station,
 wherein the framing protocol is a protocol for communication between a gateway and the base station, and
 the header includes identification information corresponding to quality of service for the uplink data.

Supplementary Note 37

A computer-readable non-transitory recording medium having recorded thereon a program for causing a processor to execute:
 adding a header of a framing protocol to uplink data transmitted by a terminal apparatus through a wireless local area network; and
 transmitting the uplink data to which the header is added to a base station,
 wherein the framing protocol is a protocol for communication between a gateway and the base station, and
 the header includes identification information corresponding to quality of service for the uplink data.

Supplementary Note 38

A method comprising:
 transmitting, to a terminal apparatus through a wireless local area network, downlink data from a base station or receiving uplink data from a terminal apparatus through the wireless local area network;
 obtaining convergence information about convergence at a gateway or the wireless local area network; and
 transmitting the convergence information to the base station.

Supplementary Note 39

A program for causing a processor to execute:
 transmitting, to a terminal apparatus through a wireless local area network, downlink data from a base station or receiving uplink data from a terminal apparatus through the wireless local area network;
 obtaining convergence information about convergence at a gateway or the wireless local area network; and
 transmitting the convergence information to the base station.

Supplementary Note 40

A computer-readable non-transitory recording medium having recorded thereon a program for causing a processor to execute:
 transmitting, to a terminal apparatus through a wireless local area network, downlink data from a base station or receiving uplink data from a terminal apparatus through the wireless local area network;
 obtaining convergence information about convergence at a gateway or the wireless local area network; and
 transmitting the convergence information to the base station.

Supplementary Note 41

A method comprising:
 receiving, from a gateway that is used for communication between a base station and a terminal apparatus through a wireless local area network, convergence information about convergence at the gateway or the wireless local area network.

Supplementary Note 42

A program for causing a processor to execute:
 receiving, from a gateway that is used for communication between a base station and a terminal apparatus through a wireless local area network, convergence information about convergence at the gateway or the wireless local area network.

Supplementary Note 43

A computer-readable non-transitory recording medium having recorded thereon a program for causing a processor to execute:
 receiving, from a gateway that is used for communication between a base station and a terminal apparatus through a wireless local area network, convergence information about convergence at the gateway or the wireless local area network.

Supplementary Note 44

A method comprising:
 receiving, from a gateway that is used for communication between a base station and a terminal apparatus through a wireless local area network, performance information about communication performance at the gateway or the wireless local area network; and
 measuring performance related to the gateway or the wireless local area network on the basis of the performance information.

Supplementary Note 45

A program for causing a processor to execute:
 receiving, from a gateway that is used for communication between a base station and a terminal apparatus through a wireless local area network, performance information about communication performance at the gateway or the wireless local area network; and
 measuring performance related to the gateway or the wireless local area network on the basis of the performance information.

Supplementary Note 46

A computer-readable non-transitory recording medium having recorded thereon a program for causing a processor to execute:

receiving, from a gateway that is used for communication between a base station and a terminal apparatus through a wireless local area network, performance information about communication performance at the gateway or the wireless local area network; and measuring performance related to the gateway or the wireless local area network on the basis of the performance information.

Supplementary Note 47

A method comprising:
transmitting, to a terminal apparatus through a wireless local area network, downlink data from a base station or receiving uplink data from a terminal apparatus through the wireless local area network;
obtaining performance information about communication performance at a gateway or the wireless local area network; and
transmitting the performance information to the base station.

Supplementary Note 48

A program for causing a processor to execute:
transmitting, to a terminal apparatus through a wireless local area network, downlink data from a base station or receiving uplink data from a terminal apparatus through the wireless local area network;
obtaining performance information about communication performance at a gateway or the wireless local area network; and
transmitting the performance information to the base station.

Supplementary Note 49

A computer-readable non-transitory recording medium having recorded thereon a program for causing a processor to execute:
transmitting, to a terminal apparatus through a wireless local area network, downlink data from a base station or receiving uplink data from a terminal apparatus through the wireless local area network;
obtaining performance information about communication performance at a gateway or the wireless local area network; and
transmitting the performance information to the base station.

INDUSTRIAL APPLICABILITY

An improvement on the case where data of a cellular network is transmitted and/or received through WLAN can be achieved.

REFERENCE SIGNS LIST

1 System
10 eNB (evolved Node B)
20 LTE/WLAN Radio Level Integration with IPsec Tunnel (LWIP)-Security Gateway (SeGW)
30, 300 Wireless Local Area Network Access Point (WLAN-AP)
40 User Equipment (UE)
50 Mobility Management Entity (MME)
60 Serving Gateway (S-GW)

100 Base Station
141, 171 First Communication Processing Unit
143, 173 Second Communication Processing Unit
145, 153 Control Unit
151, 161, 181, 191 Communication Processing Unit
163, 193 Measurement Unit
200 Gateway
231, 261 First Communication Processing Unit
233, 263 Second Communication Processing Unit
235 Control Unit
241, 251, 271, 281 Communication Processing Unit
243, 253, 273, 283 Information Obtaining Unit
400 Terminal Apparatus
500 Core Network

What is claimed is:

1. A base station comprising:
a memory storing instructions; and
one or more processors configured to execute the instructions to:
add a header of a framing protocol to downlink data transmitted to a terminal apparatus;
transmit the downlink data to which the header is added to a gateway that is used for transmission from the base station to the terminal apparatus through a wireless local area network; and
perform priority control on transmission of the downlink data to which the header is added on the basis of identification information,
wherein the framing protocol is a protocol used for communication between the base station and the gateway, the protocol not being used for communication between the gateway and the terminal apparatus,
the header includes the identification information corresponding to quality of service for the downlink data, and
the priority control includes queueing or traffic shaping for the downlink data to which the header is added, and selection of the gateway out of a plurality of gateways.

2. The base station according to claim 1, wherein the quality of service corresponds to a Quality Class Indicator (QCI) or an Internet Protocol (IP) flow for the downlink data.

3. The base station according to claim 1, wherein the identification information is identification information for identifying a bearer for the downlink data.

4. The base station according to claim 1, wherein the framing protocol is a tunneling protocol.

5. The base station according to claim 4, wherein the framing protocol is GPRS Tunneling Protocol user plane (GTP-u) or Generic Routing Encapsulation (GRE).

6. The base station according to claim 5, wherein the identification information is Tunnel Endpoint Identifier (TEID) of GTP-u or a key of GRE.

7. The base station according to claim 1, wherein the priority control further includes:
determination of a Differentiated Service Code Point (DSCP) value in an Internet Protocol (IP) header added to the downlink data to which the header is added.

8. The base station according to claim 1, wherein
the base station is an evolved Node B (eNB), and
the terminal apparatus is a User Equipment (UE).

9. The base station according to claim 1, wherein the gateway is a security gateway.

10. The base station according to claim 9, wherein the gateway is an LTE WLAN RAN Level Integration using IPSec Security Gateway (LWIP-SeGW).

11. A gateway comprising:
a memory storing instructions; and
one or more processors configured to execute the instructions to:
add a header of a framing protocol to uplink data transmitted by a terminal apparatus through a wireless local area network;
transmit the uplink data to which the header is added to a base station; and
perform priority control on transmission of the uplink data to which the header is added on the basis of identification information,
wherein the framing protocol is a protocol used for communication between the gateway and the base station, the protocol not being used for communication between the gateway and the terminal apparatus,
the header includes the identification information corresponding to quality of service for the uplink data, and
the priority control includes queueing or traffic shaping for the uplink data to which the header is added.

12. The gateway according to claim 11, wherein the identification information is identification information for identifying a bearer for the uplink data.

13. The gateway according to claim 11, wherein the priority control includes:
determination of a Differentiated Service Code Point (DSCP) value in an IP header added to the uplink data to which the header is added.

14. The gateway according to claim 11, wherein the identification information is information included in the uplink data or information transmitted by the terminal apparatus along with the uplink data.

15. The gateway according to claim 11, wherein the one or more processors are configured to execute the instructions to receive information indicative of the quality of service corresponding to the identification information from the base station.

16. A method comprising:
adding a header of a framing protocol to downlink data transmitted to a terminal apparatus;
transmitting the downlink data to which the header is added to a gateway that is used for transmission from a base station to the terminal apparatus through a wireless local area network; and
performing priority control on transmission of the downlink data to which the header is added on the basis of identification information,
wherein the framing protocol is a protocol used for communication between the base station and the gateway, the protocol not being used for communication between the gateway and the terminal apparatus,
the header includes the identification information corresponding to quality of service for the downlink data, and
the priority control includes queueing or traffic shaping for the downlink data to which the header is added, and selection of the gateway out of a plurality of gateways.

* * * * *